(12) United States Patent
Wang et al.

(10) Patent No.: US 12,450,323 B2
(45) Date of Patent: Oct. 21, 2025

(54) IDENTITY AUTHENTICATION METHOD AND SYSTEM

(71) Applicants: HUAWEI TECHNOLOGIES CO., LTD., Shenzhen (CN); TSINGHUA UNIVERSITY, Beijing (CN)

(72) Inventors: Renyu Wang, Shenzhen (CN); Zhendong Gao, Shanghai (CN); Jing Wu, Shanghai (CN); Dong Wang, Beijing (CN); Lantian Li, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 128 days.

(21) Appl. No.: 18/323,971

(22) Filed: May 25, 2023

(65) Prior Publication Data

US 2023/0297659 A1 Sep. 21, 2023

Related U.S. Application Data

(63) Continuation of application No. PCT/CN2021/101301, filed on Jun. 21, 2021.

(30) Foreign Application Priority Data

Nov. 25, 2020 (CN) .............................. 202011341050

(51) Int. Cl.
*G06F 21/32* (2013.01)
(52) U.S. Cl.
CPC .................................... *G06F 21/32* (2013.01)
(58) Field of Classification Search
CPC ........... G06F 21/32; G06F 17/18; G06N 3/08; G06N 20/00
See application file for complete search history.

(56) References Cited

U.S. PATENT DOCUMENTS 8,340,361 B2 * 12/2012 Murakami .......... G06F 18/2415
700/47
2009/0289760 A1 * 11/2009 Murakami ............. G06V 40/70
340/5.82

(Continued)

FOREIGN PATENT DOCUMENTS

CN 105096121 A * 11/2015 ............. G06F 21/32
CN 105788600 A 7/2016

(Continued)

OTHER PUBLICATIONS

Sinharay et al., "The Use of the Posterior Probability in Score Differencing," Journal of Educational and Behavioral Statistics, vol. 46, No. 4, DOI: 10.3102/1076998620957423, pp. 403-429 (Sep. 22, 2020).

*Primary Examiner* — Javier O Guzman
(74) *Attorney, Agent, or Firm* — Leydig, Voit & Mayer, Ltd.

(57) ABSTRACT

An identity authentication method is provided, which relates to the field of artificial intelligence. The method includes: obtaining a biological feature extracted from a first registration object in a registration scenario; obtaining a biological feature extracted from a first recognition object in a recognition scenario; calculating a likelihood score based on the biological feature of the first registration object and the biological feature of the first recognition object; and determining, based on the likelihood score, whether an identity of the first recognition object is consistent with an identity of the first registration object. The likelihood score includes a posterior probability part and a marginal probability part.

23 Claims, 5 Drawing Sheets

(56) References Cited

U.S. PATENT DOCUMENTS

| | | | |
|---|---|---|---|
| 2010/0325443 A1* | 12/2010 | Mattsson | G06Q 20/382 |
| | | | 713/189 |
| 2017/0132407 A1* | 5/2017 | Sakumoto | G06F 21/44 |
| 2019/0088262 A1* | 3/2019 | Wang | G10L 17/06 |
| 2021/0209388 A1* | 7/2021 | Ciftci | G06N 3/045 |
| 2021/0334630 A1* | 10/2021 | Lambert | G06N 3/047 |
| 2021/0389854 A1* | 12/2021 | Rose | G06F 3/0482 |
| 2022/0012464 A1* | 1/2022 | Kim | G06V 40/13 |
| 2023/0162757 A1* | 5/2023 | Zheng | H04R 1/406 |
| | | | 704/233 |

FOREIGN PATENT DOCUMENTS

| | | | | |
|---|---|---|---|---|
| CN | 107680600 A | * | 2/2018 | G10L 17/02 |
| CN | 109378006 A | | 2/2019 | |
| CN | 112487384 A | | 3/2021 | |

* cited by examiner

IDENTITY AUTHENTICATION METHOD AND SYSTEM

CROSS-REFERENCE TO RELATED APPLICATIONS

This application is a continuation of International Application No. PCT/CN2021/101301, filed on Jun. 21, 2021, which claims priority to Chinese Patent Application No. 202011341050.8, filed on Nov. 25, 2020. The disclosures of the aforementioned applications are hereby incorporated by reference in their entireties.

STATEMENT OF JOINT RESEARCH AGREEMENT

The subject matter and the claimed invention were made by or on the behalf of Tsinghua University, of Haidian District, Beijing, P.R. China and Huawei Technologies Co., Ltd., of Shenzhen, Guangdong Province, P.R. China, under a joint research agreement titled "Cross-Device Voiceprint Recognition Technology Cooperation Project". The joint research agreement was in effect on or before the claimed invention was made, and that the claimed invention was made as a result of activities undertaken within the scope of the joint research agreement.

TECHNICAL FIELD

Embodiments of this application relate to the field of artificial intelligence, and in particular, to a method and system for performing identity authentication by using a biological feature of a user.

BACKGROUND

A biological feature of a user may be registered by using the biological feature of the user, and an identity of the user is authenticated based on the registered biological feature during recognition. For example, in common facial recognition, fingerprint recognition, and voiceprint recognition, feature comparison and identity authentication are completed by comparing a feature reserved by the user in advance with a feature collected during recognition. The common voiceprint recognition, also known as speaker recognition, is used as an example, and the voiceprint recognition is automatic authentication of an identity of a speaker by using feature information that is of the speaker and that is included in a voice. The voiceprint recognition usually includes two phases: a registration phase and a recognition phase. In the registration phase, a voiceprint feature is extracted from a voice reserved by the speaker, and then a corresponding speaker model is obtained based on voiceprint feature training, and the model is stored. In the recognition phase, the speaker is recognized and authenticated, voiceprint feature extraction is performed on a recognized voice, likelihood scoring is performed on a similarity between the voiceprint feature obtained during recognition and a model stored in a model library, and finally the identity of the speaker is determined based on a likelihood score. In voiceprint recognition based on a deep neural network, a large quantity of speaker training corpora are usually used to train the deep neural network, then voiceprint feature extraction is performed on an original acoustic feature by using a neural network obtained through training, and an extracted feature indicates a speaker feature. Commonly used voiceprint features include I-vector, TDNN-X-vector, RESNET-embedding, and the like.

A voiceprint recognition technology and a similar technology that performs identity authentication based on a biological feature have a robustness problem during recognition. The voiceprint recognition is used as an example. Actually, it is often necessary to establish a voiceprint model of a user based on a small quantity of reserved voice messages provided by the user, but it is difficult to capture a robust voiceprint feature based on the small quantity of reserved voice messages. Consequently, a voice feature obtained through training cannot well cover a change of the speaker, and a voice feature obtained during voiceprint registration does not match the voice feature obtained during recognition. On the other hand, in a recognition scenario, a voice feature of the speaker may vary with time, a speaking status, a speaking manner, and the like, and factors such as noise interference and a channel device difference may also exist. In addition, different apparatuses used in the voiceprint registration and voiceprint recognition cause a channel difference, and a feature space of the speaker changes. These factors also results in that the voice feature obtained during voiceprint registration does not match the voice feature obtained during recognition. A mismatch between a voiceprint registration scenario and a voiceprint recognition scenario reduces recognition accuracy and affects user experience.

In the conventional technology, to resolve the mismatch between the voiceprint registration scenario and the voiceprint recognition scenario, the following methods are mainly used: enhancing and transforming raw data and a raw feature of the mismatched scenarios, to meet a requirement of the registration scenario as much as possible; performing optimization during model training, to reduce sensitivity of a voiceprint feature of a user that varies with the user or a scenario, so as to reduce impact of the scenario mismatch; and modeling a scoring model (for example, an adaptive PLDA model) of a specific scenario during scoring at the backend. However, in the conventional technology, impact caused by the scenario mismatch on the voiceprint feature change is weakened in terms of a data feature or model training, and objective statistical inconsistency between data collected in the registration scenario and data collected in the recognition scenario is not fully considered. Therefore, it is difficult to fundamentally compensate for a difference caused by the scenario mismatch. In addition, the methods in the conventional technology do not fully consider various causes of the scenario mismatch. Therefore, a technical solution is required to accept objective existence of the scenario mismatch and fully considers various causes of the scenario mismatch.

SUMMARY

An objective of this application is to provide an identity authentication method and system to resolve a technical problem in the conventional technology, such as deterioration of identity authentication performance caused by a scenario mismatch.

According to a first aspect, an embodiment of this application provides an identity authentication method. The method includes: obtaining a biological feature extracted from a first registration object in a registration scenario; obtaining a biological feature extracted from a first recognition object in a recognition scenario; calculating a likelihood score based on the biological feature of the first registration object and the biological feature of the first recognition object; and determining, based on the likelihood score, whether an identity of the first recognition object is consistent with an identity of the first registration object. The likelihood score includes a posterior probability part and a marginal probability part. The posterior probability part is determined based on the biological feature of the first registration object, a probability distribution model of the registration scenario, and a mapping relationship between the probability distribution model of the registration scenario and a probability distribution model of the recognition scenario. The probability distribution model of the registration scenario includes probability distribution parameters between different registration objects and probability distribution parameters between different samples of a same registration object when a biological feature is extracted from one or more registration objects in the registration scenario, and the probability distribution model of the recognition scenario includes probability distribution parameters between different recognition objects and probability distribution parameters between different samples of a same recognition object when a biological feature is extracted from one or more recognition objects in the recognition scenario. The marginal probability part is determined based on the biological feature of the first recognition object, the probability distribution model of the recognition scenario, and the mapping relationship.

According to the technical solution described in the first aspect, different probability distribution models and distribution parameters are separately used for the registration scenario and the recognition scenario, and the likelihood score in a scenario mismatch case is corrected with reference to the mapping relationship, which helps compensate for a loss caused by the scenario mismatch.

According to the first aspect, in a possible implementation, the calculating a likelihood score based on the biological feature of the first registration object and the biological feature of the first recognition object includes: mapping the biological feature of the first recognition object from the recognition scenario to the registration scenario based on the mapping relationship, to obtain a mapped biological feature of the first recognition object; calculating a posterior probability distribution template of the probability distribution model in the registration scenario based on the biological feature of the first registration object; calculating the posterior probability part of the probability distribution model in the registration scenario based on the posterior probability distribution template and the mapped biological feature of the first recognition object; calculating the marginal probability part of the probability distribution model in the recognition scenario based on the biological feature of the first recognition object; and obtaining the likelihood score based on the posterior probability part and the marginal probability part.

In this way, a corresponding likelihood scoring method is designed through the mapping from the recognition scenario to the registration scenario, which helps avoid a loss of identity authentication performance caused by a scenario mismatch.

According to the first aspect, in a possible implementation, the calculating a likelihood score based on the biological feature of the first registration object and the biological feature of the first recognition object includes: calculating a posterior probability distribution template of the probability distribution model in the registration scenario based on the biological feature of the first registration object; mapping the posterior probability distribution template from the registration scenario to the recognition scenario based on the mapping relationship, to obtain a mapped posterior probability distribution template; calculating the posterior probability part of the probability distribution model in the recognition scenario based on the mapped posterior probability distribution template; calculating the marginal probability part of the probability distribution model in the recognition scenario based on the feature of the first recognition object; and obtaining the likelihood score based on the posterior probability part and the marginal probability part.

In this way, a corresponding likelihood scoring method is designed through the mapping from the registration scenario to the recognition scenario, which helps avoid a loss of identity authentication performance caused by a scenario mismatch.

According to the first aspect, in a possible implementation, both the probability distribution model of the registration scenario and the probability distribution model of the recognition scenario comply with a linear Gaussian distribution; the probability distribution parameters between the different registration objects include a mean and a variance of feature space distributions of the different registration objects in the registration scenario; the probability distribution parameters between the different samples of the same registration object include a variance of feature space distributions of the same registration object in the registration scenario; the probability distribution parameters between the different recognition objects include a mean and a variance of feature space distributions of the different recognition objects in the recognition scenario; and the probability distribution parameters between the different samples of the same recognition object include a variance of feature space distributions of the same recognition object in the recognition scenario.

In this way, correction to a mismatch between different scenarios complying with the linear Gaussian distribution is implemented.

According to the first aspect, in a possible implementation, the likelihood score is calculated based on the linear Gaussian distribution.

In this way, correction to a mismatch between different scenarios in the Gaussian distribution is implemented.

According to the first aspect, in a possible implementation, the mapping relationship is determined according to a trained mapping function, and the trained mapping function is obtained by using the following method: estimating a feature distribution in the registration scenario based on registration training data; estimating a feature distribution in the recognition scenario based on recognition training data; calculating, according to a mapping function and based on the registration training data and the recognition training data, a loss function based on a criterion for maximum likelihood estimation, where the mapping function is used for reversible mapping between the feature distribution in the registration scenario and the feature distribution in the recognition scenario; and adjusting a parameter of the mapping function according to the loss function until the loss function meets loss converge, to obtain the trained mapping function.

In this way, the mapping function is trained with reference to a deep learning algorithm and the likelihood score is obtained.

According to the first aspect, in a possible implementation, the mapping function is a linear function of one variable, and the parameter of the mapping function includes two constants of the linear function of one variable.

In this way, correction to a mismatch between scenarios meeting a linear reversible mapping relationship is implemented.

According to the first aspect, in a possible implementation, a machine learning model corresponding to the loss function is used for a maximum likelihood probability linear regression MLLR task.

In this way, the mapping function is trained by using the machine learning model of the MLLR task.

According to the first aspect, in a possible implementation, the method further includes: obtaining biological features extracted from a plurality of samples of a second recognition object in the recognition scenario, and calculating likelihood scores respectively corresponding to the plurality of samples of the second recognition object; selecting, based on the likelihood scores respectively corresponding to the plurality of samples of the second recognition object, a feature used for status update from the biological features extracted from the plurality of samples of the second recognition object; and updating, by using the feature used for the status update, the probability distribution parameters between the different samples of the same recognition object included in the probability distribution model of the recognition scenario. In this way, the distribution parameter is adjusted and updated based on the biological features of the plurality of samples of the second recognition object, which facilitates dynamic adjustment and update based on a change of the recognition object.

According to the first aspect, in a possible implementation, the method further includes: clustering, by using a clustering algorithm, the probability distribution parameters between the different samples of the same recognition object included in the probability distribution model of the recognition scenario to obtain a plurality of submodels, where the plurality of submodels separately correspond to different statuses of the same recognition object; and the marginal probability part of the likelihood score is fused with scoring results of the plurality of submodels. In this way, scoring fusion is implemented by using the clustering algorithm, so that adjustment is made based on the different statuses of the same recognition object.

According to the first aspect, in a possible implementation, the biological feature includes a voiceprint feature. In this way, correction to a mismatch between scenarios performing identity authentication based on voiceprint recognition is implemented.

According to the first aspect, in a possible implementation, the biological feature includes a facial feature. In this way, correction to a mismatch between scenarios performing identity authentication based on facial recognition is implemented.

According to the first aspect, in a possible implementation, the biological feature includes a fingerprint feature. In this way, correction to a mismatch between scenarios performing identity authentication based on fingerprint recognition is implemented.

According to the first aspect, in a possible implementation, the registration scenario and the recognition scenario separately correspond to different devices. In this way, cross-device registration and recognition are implemented.

According to a second aspect, an embodiment of this application provides a chip system. The chip system is applied to an electronic device. The chip system includes one or more interface circuits and one or more processors; the interface circuit and the processor are interconnected through a line; the interface circuit is configured to receive a signal from a memory of the electronic device, and send the signal to the processor, where the signal includes computer instructions stored in the memory; and when the processor executes the computer instructions, the electronic device performs the identity authentication method according to the first aspect.

According to the technical solution described in the second aspect, by using the chip system, different probability distribution models and distribution parameters are separately used for a registration scenario and a recognition scenario, and a likelihood score in a scenario mismatch case is corrected with reference to a mapping relationship, which helps compensate for a loss caused by the scenario mismatch.

According to a third aspect, an embodiment of this application provides a computer-readable storage medium. The computer-readable storage medium stores computer program instructions, and when the computer program instructions are run by a processor, the processor is enabled to perform the identity authentication method according to the first aspect.

According to the technical solution described in the third aspect, by using the computer-readable storage medium, different probability distribution models and distribution parameters are separately used for a registration scenario and a recognition scenario, and a likelihood score in a scenario mismatch case is corrected with reference to the mapping relationship, which helps compensate for a loss caused by the scenario mismatch.

According to a fourth aspect, an embodiment of this application provides a computer program product. The computer program product includes computer program instructions, and when the computer program instructions are run by a processor, the processor is enabled to perform the identity authentication method according to the first aspect.

According to the technical solution described in the fourth aspect, by executing the computer program instructions, different probability distribution models and distribution parameters are separately used for the registration scenario and the recognition scenario, and a likelihood score in a scenario mismatch case is corrected with reference to a mapping relationship, which helps compensate for a loss caused by the scenario mismatch.

According to a fifth aspect, an embodiment of this application provides an identity authentication system. The identity authentication system includes: a registration module, configured to obtain a biological feature extracted from a first registration object in a registration scenario; a recognition module, configured to obtain a biological feature extracted from a first recognition object in a recognition scenario; and a decision module, configured to: calculate a likelihood score based on the biological feature of the first registration object and the biological feature of the first recognition object, and determine, based on the likelihood score, whether an identity of the first recognition object is consistent with an identity of the first registration object. The likelihood score includes a posterior probability part and a marginal probability part; the posterior probability part is determined based on the biological feature of the first registration object, a probability distribution model of the registration scenario, and a mapping relationship between the probability distribution model of the registration scenario and a probability distribution model of the recognition scenario; the probability distribution model of the registration scenario includes probability distribution parameters between different registration objects and probability distribution parameters between different samples of a same registration object when a biological feature is extracted from one or more registration objects in the registration scenario, and the probability distribution model of the recognition scenario includes probability distribution parameters between different recognition objects and probability distribution parameters between different samples of a same recognition object when a biological feature is extracted from one or more recognition objects in the recognition scenario; and the marginal probability part is determined based on the biological feature of the first recognition object, the probability distribution model of the recognition scenario, and the mapping relationship.

According to the technical solution described in the fifth aspect, different probability distribution models and distribution parameters are separately used for the registration scenario and the recognition scenario, and the likelihood score in a scenario mismatch case is corrected with reference to the mapping relationship, which helps compensate for a loss caused by the scenario mismatch.

BRIEF DESCRIPTION OF DRAWINGS

To describe technical solutions in embodiments of this application or in the background, the following describes accompanying drawings used in embodiments of this application or in the background.

DESCRIPTION OF EMBODIMENTS

Figure 1:
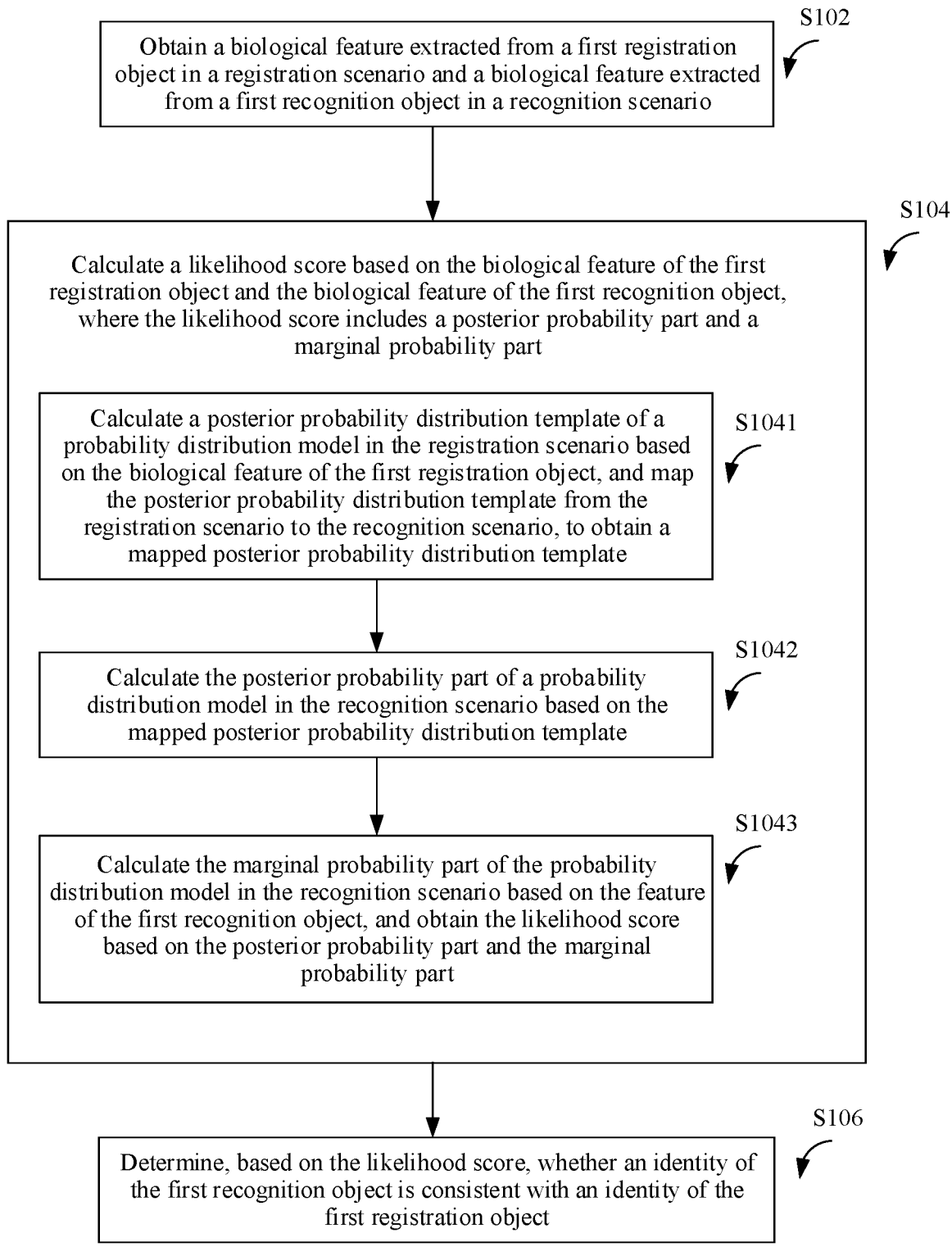
FIG. 1 is a schematic flowchart of an implementation of an identity authentication method according to an embodiment of this application.

Embodiments of this application provide an identity authentication method and system. The identity authentication system includes: a registration module, configured to obtain a biological feature extracted from a first registration object in a registration scenario; a recognition module, configured to obtain a biological feature extracted from a first recognition object in a recognition scenario; and a decision module, configured to: calculate a likelihood score based on the biological feature of the first registration object and the biological feature of the first recognition object, and determine, based on the likelihood score, whether an identity of the first recognition object is consistent with an identity of the first registration object. The likelihood score includes a posterior probability part and a marginal probability part; the posterior probability part is determined based on the biological feature of the first registration object, a probability distribution model of the registration scenario, and a mapping relationship between the probability distribution model of the registration scenario and a probability distribution model of the recognition scenario; the probability distribution model of the registration scenario includes probability distribution parameters between different registration objects and probability distribution parameters between different samples of a same registration object when a biological feature is extracted from one or more registration objects in the registration scenario, and the probability distribution model of the recognition scenario includes probability distribution parameters between different recognition objects and probability distribution parameters between different samples of a same recognition object when a biological feature is extracted from one or more recognition objects in the recognition scenario; and the marginal probability part is determined based on the biological feature of the first recognition object, the probability distribution model of the recognition scenario, and the mapping relationship. In this way, different probability distribution models and distribution parameters are separately used for the registration scenario and the recognition scenario, and the likelihood score in a scenario mismatch case is corrected with reference to the mapping relationship, which helps compensate for a loss caused by the scenario mismatch.

Embodiments of this application may be used in the following application scenarios: a field in which identity authentication needs to be performed by using a biological feature, such as voiceprint recognition, facial recognition, or fingerprint recognition, or an application scenario in which a scenario mismatch caused by a feature space change of a biological feature needs to be handled, for example, cross-device and cross-channel use registration and recognition.

Embodiments of this application may be adjusted and improved based on a specific application environment. This is not specifically limited herein.

To make a person skilled in the art understand solutions in this application better, the following describes embodiments of this application with reference to accompanying drawings in embodiments of this application.

FIG. 1 is a schematic flowchart of an implementation of an identity authentication method according to an embodiment of this application. As shown in FIG. 1, the method includes the following steps.

Step S102: Obtain a biological feature extracted from a first registration object in a registration scenario and a biological feature extracted from a first recognition object in a recognition scenario.

It should be understood that the biological feature may be a voiceprint feature, a facial feature, a fingerprint feature, or another biological feature used for identity authentication. The first registration object is defined as a person providing a biological feature, and the first recognition object is a person whose identity corresponds to the provided biological feature. For example, the biological feature is a voiceprint feature. The first registration object is a user who performs voiceprint feature registration in the registration scenario, or may be referred to as a speaker in the registration scenario. Correspondingly, the first recognition object is a user who performs voiceprint feature recognition in the recognition scenario, or may be referred to as a speaker in the recognition scenario.

Step S104: Calculate a likelihood score based on the biological feature of the first registration object and the biological feature of the first recognition object, where the likelihood score includes a posterior probability part and a marginal probability part.

The posterior probability part is determined based on the biological feature of the first registration object, a probability distribution model of the registration scenario, and a mapping relationship between the probability distribution model of the registration scenario and a probability distribution model of the recognition scenario. The marginal probability part is determined based on the biological feature of the first recognition object, the probability distribution model of the recognition scenario, and the mapping relationship. The probability distribution model of the registration scenario includes probability distribution parameters between different registration objects and probability distribution parameters between different samples of a same registration object when a biological feature is extracted from one or more registration objects in the registration scenario. The probability distribution model of the recognition scenario includes probability distribution parameters between different recognition objects and probability distribution parameters between different samples of a same recognition object when a biological feature is extracted from one or more recognition objects in the recognition scenario. The probability distribution model of the registration scenario may be understood as a distribution rule of the biological feature extracted in a limited space of the registration scenario. Still, for example, the biological feature is a voiceprint feature. The probability distribution model of the registration scenario may be understood as a distribution of a voiceprint feature that is of a speaker and that is extracted in the limited space of the registration scenario, or may be understood as a model used to describe a feature distribution space of voiceprint features of the entire registration scenario. In addition, there is the mapping relationship between the probability distribution model of the registration scenario and the probability distribution model of the recognition scenario. The mapping relationship may be represented by using a mapping function, and the mapping function may be linear or non-linear. The following uses a simple linear mapping function as an example. This simple linear mapping function may be expressed as a linear function of one variable with two constants.

Further, it is assumed that both the probability distribution model of the registration scenario and the probability distribution model of the recognition scenario meet a Gaussian distribution rule. This means that, in an example in which the biological feature is a voiceprint feature, a distribution of a feature space of voiceprint features of a speaker in the entire registration scenario complies with a linear Gaussian distribution, and a distribution of a feature space of voiceprint features of a speaker in the entire recognition scenario also complies with the linear Gaussian distribution. It should be understood that this embodiment of this application is also applicable to another type of distribution rule, for example, a Laplace distribution rule. The following description is provided on condition that both the probability distribution model of the registration scenario and the probability distribution model of the recognition scenario meet the Gaussian distribution rule. Specifically, it is assumed that the scenario of extracting the biological feature from the one or more registration objects in the registration scenario satisfies the probability distribution model of the registration scenario, and Formula (1) to Formula (3) may be used to describe a posterior probability distribution that is obtained through registration and that currently needs to be calculated when biological feature registration is performed on the first registration object in the registration scenario.

Formulas (1) to (3) are the following equations from top to bottom:

$$p(u)=N(u;0,\varepsilon I) \quad (1)$$

$$p(x|u)=N(x;u,\sigma I) \quad (2)$$

$$p(x)=\int p(x|u)p(u)du \quad (3)$$

In formulas (1) to (3), N indicates a Gaussian distribution function, u indicates a mean of the biological features in the entire registration scenario, $\varepsilon$ indicates the probability distribution parameter between the different registration objects included in the probability distribution model of the registration scenario, I indicates a conventional diagonal matrix, x indicates the first registration object that performs the biological feature registration in the registration scenario, and $\sigma$ indicates the probability distribution parameter between the different samples of the same registration object included in the probability distribution model of the registration scenario.

On the left of Formula (3) is the marginal probability, that is, a distribution rule of a biological feature that is recorded after the biological feature registration is performed by the first registration object in the registration scenario. On the right of Formula (3) is an expanded expression. It can be seen that expanded Formula (3) is a combination of Formula (1) and Formula (2). Formula (1) means that calculation is performed by using the Gaussian distribution function N, the mean u of the biological features in the entire registration scenario, and the probability distribution parameter $\varepsilon$ between different registration objects. On the left of Formula (2) is the posterior probability that is obtained after the first registration object x is obtained on condition that the mean u of the biological features in the entire registration scenario is calculated according to Formula (1). It should be understood that Formula (1) and Formula (3) are both expressed as marginal probabilities, and Formula (2) is expressed as the posterior probability.

Still refer Formula (1) to Formula (3), which are used to describe the probability distribution that currently needs to be calculated when the biological feature registration is performed on the first registration object in the registration scenario when the scenario of extracting the biological feature from the one or more registration objects in the registration scenario satisfies the probability distribution model of the registration scenario. Corresponding parameter replacement needs to be performed, to describe a probability distribution that currently needs to be calculated when biological feature recognition is performed on the first recognition object in the recognition scenario when the scenario of extracting the biological feature from the one or more recognition objects in the recognition scenario satisfies the probability distribution model of the recognition scenario. Specifically, $\hat{u}$ may indicate a mean of the biological features in the entire recognition scenario, $\hat{x}$ indicates the first recognition object that performs the biological feature recognition in the recognition scenario, $\hat{\varepsilon}$ indicates the probability distribution parameter between the different recognition objects included in the probability distribution model of the recognition scenario, and $\hat{\sigma}$ indicates the probability distribution parameter between the different samples of the same recognition object included in the probability distribution model of the recognition scenario. In other words, two types of marks are used to distinguish the registration scenario from the recognition scenario. Marks in Formula (1) to Formula (3) correspond to the registration scenario, and $\hat{u}$, $\hat{x}$, $\hat{\varepsilon}$, and $\hat{\sigma}$ correspond to the recognition scenario.

In actual application, a process in which the first registration object performs the biological feature registration in the registration scenario is essentially a process of performing prediction according to a posterior probability distribution template. Refer to Formula (4).

Formula (4) is the following equation:

$$p(\mu_k \mid x_1^k, \ldots, x_n^k) = N\left(\mu_k; \frac{n_k\epsilon}{n_k\epsilon + \sigma}\bar{x}_k, \frac{\epsilon\sigma}{n_k\epsilon + \sigma}I\right) \quad (4)$$

In Formula (4), $u_k$ indicates the biological feature that is recorded after the biological feature registration is performed by the first registration object in the registration scenario, N indicates the Gaussian distribution function, $x_1^k$, $x_2^k$, $x_3^k$ to $x_{nk}^k$ indicate biological features of a plurality of different registration objects that are known, $n_k$ indicates a total quantity of different samples collected when the biological feature registration is performed by the first registration object, $\epsilon$ indicates the probability distribution parameter between the different registration objects included in the probability distribution model of the registration scenario, I indicates the conventional diagonal matrix, $\bar{x}_k$ indicates a vector mean of all registered biological features of the first registration object in the registration scenario, and $\sigma$ indicates the probability distribution parameter between the different samples of the same registration object included in the probability distribution model of the registration scenario. Formula (4) is the posterior probability distribution template that is a distribution rule of a biological feature $u_k$ that is recorded after the biological feature registration is performed by the first registration object in the registration scenario on condition that the biological features of the plurality of different registration objects $x_1^k$, $x_2^k$, $x_3^k$ to $x_{nk}^k$ are known. According to the posterior probability distribution template represented by Formula (4), a corresponding posterior probability may be calculated based on the parameters in Formula (4).

In application, after the biological feature registration is performed by the first registration object in the registration scenario, it can be learned that the first registration object that performs the biological feature registration in the registration scenario is x. In this case, with reference to Formula (1) to Formula (4), on condition that the biological features of the plurality of different registration objects $x_1^k$, $x_2^k$, $x_3^k$ to $x_{nk}^k$ are known, a probability that the first registration object is x after the biological feature registration is performed in the registration scenario can be calculated. Refer to Formula (5).

Formula (5) is the following equation:

$$p_h(x) = p(x \mid x_1^k, \ldots, x_n^k) \quad (5)$$
$$= \int p(x \mid \mu_k) p(\mu_k \mid x_1^k, \ldots, x_n^k) d\mu_k$$
$$= N\left(x; \frac{n_k\epsilon}{n_k\epsilon + \sigma}\bar{x}_k, \left(\sigma + \frac{\epsilon\sigma}{n_k\epsilon + \sigma}\right)I\right)$$

In Formula (5), N indicates the Gaussian distribution function, $u_k$ indicates the biological feature that is recorded after the biological feature registration is performed by the first registration object in the registration scenario, $x_1^k$, $x_2^k$, $x_3^k$ to $x_{nk}^k$ indicate the biological features of the plurality of different registration objects that are known, $n_k$ indicates the total quantity of different samples collected when the biological feature registration is performed by the first registration object, $\epsilon$ indicates the probability distribution parameter between the different registration objects included in the probability distribution model of the registration scenario, I indicates the conventional diagonal matrix, x indicates the first registration object that performs the biological feature registration in the registration scenario, $\sigma$ indicates the probability distribution parameter between the different samples of the same registration object included in the probability distribution model of the registration scenario, and $\bar{x}_k$ indicates the vector mean of all registered biological features of the first registration object in the registration scenario. It can be seen that expanded Formula (5) is a combination of Formula (4) and Formula (2). According to Formula (5), on condition that the biological features of the plurality of different registration objects $x_1^k$, $x_2^k$, $x_3^k$ to $x_{nk}^k$ are known, the probability that the first registration object is x after the biological feature registration is performed in the registration scenario can be calculated.

To authenticate an identity of the first registration object, it is necessary to compare the biological feature extracted from the first recognition object with biological features of a plurality of registration objects with known identities during the biological feature recognition, to calculate a maximum likelihood score, and an identity of a registration object corresponding to the maximum likelihood score is an identity of the first recognition object. This process may be simplified by using a normalized likelihood (NL) score. Refer to Formula (6).

Formula (6) is the following equation:

$$NL(x \mid k) = \frac{p(x \mid H_0)}{p(x \mid H_1)} = \frac{p_k(x)}{p(x)}. \quad (6)$$

In Formula (6), NL indicates a normalized likelihood, x indicates the first registration object that performs the biological feature registration in the registration scenario, k indicates a specific category to which the registered biological feature of the first registration object belongs, $H_0$ indicates another category to which the first registration object x belongs other than the specific category k, and $H_1$ indicates another category to which the first registration object x belongs other than the specific category k. By using the normalized likelihood NL, a unified threshold may be set to determine the identity of the to-be-recognized first recognition object, and impact on the threshold caused by an excessively large difference in likelihood scoring results between different biological features of a same to-be-recognized object is reduced. It can be seen from Formula (6) that, the normalized likelihood NL after expansion includes the probability $p_k(x)$, as calculated in Formula (5), that the first registration object is x after the biological feature registration is performed in the registration scenario on condition that the biological features of the plurality of different registration objects $x_1^k$, $x_2^k$, $x_3^k$ to $x_{nk}^k$ are known, and the distribution rule, as calculated in Formula (3), of the biological feature that is recorded after the biological feature registration is performed by the first registration object in the registration scenario. The posterior probability is calculated in Formula (5), and the marginal probability is calculated in Formula (3). Therefore, the normalized likelihood score of Formula (6) may be understood as including the posterior probability part and the marginal probability part. The posterior probability part of the likelihood score is calculated according to Formula (5), and the marginal probability part of the likelihood score is calculated according to Formula (3).

The normalized likelihood NL score of Formula (6) may be calculated based on a likelihood ratio in the Gaussian distribution, and converted into Formula (7) and Formula (8).

Formula (7) is the following equation:

$$\log NL(x|k) = \log p_k(x) - \log p(x) \propto -\frac{1}{\sigma + \frac{\epsilon\sigma}{n_k\epsilon + \sigma}}\|x - \widetilde{\mu}_k\|^2 + \frac{1}{\epsilon + \sigma}\|x\|^2 \quad (7)$$

Formula (8) is the following equation:

$$\widetilde{\mu}_k = \frac{n_k\epsilon}{n_k\epsilon + \sigma}\bar{x}_k. \quad (8)$$

In Formula (7) and Formula (8), NL indicates the normalized likelihood, $\widetilde{\mu}_k$ is a variable set for concise expression, $n_k$ indicates the total quantity of different samples collected when the biological feature registration is performed by the first registration object, $\epsilon$ indicates the probability distribution parameter between the different registration objects included in the probability distribution model of the registration scenario, x indicates the first registration object that performs the biological feature registration in the registration scenario, $\sigma$ indicates the probability distribution parameter between the different samples of the same registration object included in the probability distribution model of the registration scenario, and $\bar{x}_k$ indicates the vector mean of all biological features registered by the first registration object in the registration scenario. For concise expression, some expressions in Formula (7) are integrated into the variable $\widetilde{\mu}_k$ and then described by Formula (8). In this way, by using Formula (7) and Formula (8), the likelihood scoring process of Formula (6) may be simplified, to facilitate biological feature comparison and identity authentication.

In actual application, to compensate for a loss of scoring performance caused by a scenario mismatch, correction may be performed in the following manner and based on the mapping relationship. Because the mapping relationship is reversible, a calculation process of the likelihood score may be mapped from the registration scenario to the recognition scenario, or the calculation process of the likelihood score may be mapped from the recognition scenario to the registration scenario. The following first describes an embodiment in which the calculation process of the likelihood score is mapped from the registration scenario to the recognition scenario.

In this embodiment, step S104 includes step S1041. Step S1041: Calculate a posterior probability distribution template of the probability distribution model in the registration scenario based on the biological feature of the first registration object, and map the posterior probability distribution template from the registration scenario to the recognition scenario, to obtain a mapped posterior probability distribution template.

There is the mapping relationship between the probability distribution model of the registration scenario and the probability distribution model of the recognition scenario. The mapping relationship may be expressed as the linear mapping function. Refer to Formula (9).

Formula (9) is the following equation:

$$\hat{x} = Mx + b \quad (9)$$

In Formula (9), M and b are constants of the linear mapping function, and an optimal configuration of the linear mapping function may be obtained in a manner of machine learning training, to reflect the mapping relationship to a maximum extent. Formula (9) means mapping from the registration scenario to the recognition scenario. x indicates the first registration object that performs the biological feature registration in the registration scenario, and $\hat{x}$ indicates a biological feature that maps x to the recognition scenario according to the linear mapping function.

First, the posterior probability distribution template is calculated on the probability distribution model of the registration scenario based on the biological feature of the first registration object, and based on the mapping relationship, the posterior probability distribution template is mapped from the registration scenario to the recognition scenario, to obtain the mapped posterior probability distribution template. Herein, the posterior probability distribution template is in a sense of the registration scenario, that is, refers to Formula (4). Formula (4) is the posterior probability distribution template, which means, on condition that the biological features of the plurality of different registration objects $x_1^k$, $x_2^k$, $x_3^k$ to $x_{n_k}^k$ are known, the distribution rule of the biological feature $u_k$ that is recorded after the biological feature registration is performed by the first registration object in the registration scenario.

To map the posterior probability distribution template in the registration scenario represented by Formula (4) to the recognition scenario to obtain the mapped posterior probability distribution template, Formula (10) needs to be obtained with reference to Formula (4) and Formula (9).

Formula (10) is the following equation:

$$p'(\hat{\mu}_k | x_1^k, \ldots x_{n_k}^k) = N\left(\hat{\mu}_k; \frac{n_k\epsilon}{n_k\epsilon + \sigma}M\bar{x}_k + b, \frac{\epsilon\sigma}{n_k\epsilon + \sigma}MM^T\right) \quad 10)$$

In Formula (10), $\hat{u}_k$ indicates the mean of the biological features for the biological feature recognition in the entire recognition scenario, N indicates the Gaussian distribution function, $x_1^k$, $x_2^k$, $x_3^k$ to $x_{n_k}^k$ indicate the biological features of the plurality of different registration objects that are known, $n_k$ indicates the total quantity of different samples collected when the biological feature registration is performed by the first registration object, e indicates the probability distribution parameter between the different registration objects included in the probability distribution model of the registration scenario, I indicates the conventional diagonal matrix, $\bar{x}_k$ indicates the vector mean of all biological features registered by the first registration object in the registration scenario, $\sigma$ indicates the probability distribution parameter between the different samples of the same registration object included in the probability distribution model of the registration scenario, and M and b are the constants of the linear mapping function. It should be understood that, in Formula (10), the constant M of the mapping function is indicated in a form of a matrix, and $M^T$ indicates a transpose of the matrix. Formula (10) means the mapped posterior probability distribution template. It can be learned that Formula (10) corresponds to Formula (4), but indicates a posterior probability distribution rule in the recognition scenario.

In this embodiment, step S104 further includes Step S1042: Calculate the posterior probability part of the probability distribution model in the recognition scenario based on the mapped posterior probability distribution template.

In the sense of the registration scenario, starting from the posterior probability distribution template represented by Formula (4), and with reference to Formula (2), the posterior probability that the first registration object is x after the biological feature registration is performed in the registration scenario and that is represented by Formula (5) may be obtained. Therefore, the posterior probability part of the probability distribution model in the recognition scenario may be calculated based on the mapped posterior probability distribution template represented by Formula (10). Specifically, a part corresponding to Formula (4) in the expanded expression of Formula (5) may be replaced with Formula (10), to obtain Formula (11).

Formula (11) is the following equation:

$$p'_k(\hat{x}) = \int (p'(\hat{x}|\hat{\mu}_k) p'(\hat{\mu}_k | x_1^k, \ldots x_{n_k}^k) d\hat{\mu}_k \quad (11)$$
$$= N\left(\hat{x}; \frac{n_k \epsilon}{n_k \epsilon + \sigma} M\bar{x}_k + b + \hat{\sigma} I + \frac{\epsilon \sigma}{n_k \epsilon + \sigma} MM^T\right)$$

In Formula (11), $\hat{x}$ indicates the first recognition object that performs the biological feature recognition in the recognition scenario, $\hat{u}_k$ indicates the mean of the biological features for the biological feature recognition in the entire recognition scenario, N indicates the Gaussian distribution function, $x_1^k, x_2^k, x_3^k$ to $x_{n_k}^k$ indicate the biological features of the plurality of different registration objects that are known, $n_k$ indicates the total quantity of different samples collected when the biological feature registration is performed by the first registration object, $\epsilon$ indicates the probability distribution parameter between the different registration objects included in the probability distribution model of the registration scenario, I indicates the conventional diagonal matrix, $\bar{x}_k$ indicates the vector mean of all biological features registered by the first registration object in the registration scenario, u indicates the probability distribution parameter between the different samples of the same registration object included in the probability distribution model of the registration scenario, and M and b are the constants of the linear mapping function.

In this way, similar to calculating Formula (5) from Formula (4), Formula (11) may be calculated from Formula (10). Formula (11) means that, on condition that the biological features of the plurality of different registration objects $x_1^k, x_2^k, x_3^k$ to $x_{n_k}^k$ are known, a probability that the first recognition object is $\hat{x}$ after the biological feature recognition is performed in the recognition scenario.

In this embodiment, step S104 further includes step S1043: Calculate the marginal probability part of the probability distribution model in the recognition scenario based on the feature of the first recognition object; and obtain the likelihood score based on the posterior probability part and the marginal probability part.

For calculating a normalized likelihood score in the recognition scenario, refer to Formula (6). The calculated posterior probability part of the probability distribution model in the recognition scenario based on the mapped posterior probability distribution template in Formula (11) needs to be used to replace the posterior probability part calculated in the registration scenario in Formula (6). Then, a distribution rule of a biological feature that is recorded after the biological feature recognition is performed by the first recognition object in the recognition scenario is calculated according to Formula (3), and parameters and identifiers corresponding to the recognition scenario needs to be used to replace the parameters and identifiers corresponding to the registration scenario in Formula (3). A form of the likelihood score obtained in this way is similar to that of Formula (6), except that the posterior probability part of the likelihood score is calculated according to Formula (11), and the marginal probability part of the likelihood score is calculated by replacing the parameters and identifiers corresponding to the registration scenario in Formula (3) with the parameters and identifiers corresponding to the recognition scenario.

The likelihood score NL in the recognition scenario may be calculated based on a likelihood ratio in the Gaussian distribution, and converted into Formula (12) and Formula (13).

Formula (12) is the following equation:

$$\log NL \propto -(\hat{x} - \hat{\mu}_k)^T \hat{\Sigma}^{-1} (\hat{x} - \hat{\mu}_k) + \frac{1}{\hat{\epsilon} + \hat{\sigma}} \|\hat{x}\|^2 \quad 12)$$

Formula (13) is the following equation:

$$\hat{\mu}_k = \frac{n_k \epsilon}{n_k \epsilon + \sigma} M\bar{x}_k + b \quad 13)$$
$$\hat{\Sigma} = \frac{\epsilon \sigma}{n_k \epsilon + \sigma} MM^T$$

In Formula (12) and Formula (13), x indicates the first recognition object that performs the biological feature recognition in the recognition scenario, $\hat{\epsilon}$ indicates the probability distribution parameter between the different recognition objects included in the probability distribution model of the recognition scenario, $\hat{\sigma}$ indicates the probability distribution parameter between the different samples of the same recognition object included in the probability distribution model of the recognition scenario, $n_k$ indicates the total quantity of different samples collected when the biological feature registration is performed by the first registration object, $\epsilon$ indicates the probability distribution parameter between the different registration objects included in the probability distribution model of the registration scenario, I indicates the conventional diagonal matrix, $\bar{x}_k$ indicates the vector mean of all biological features registered by the first registration object in the registration scenario, $\sigma$ indicates the probability distribution parameter between the different samples of the same registration object included in the probability distribution model of the registration scenario, and M and b are the constants of the linear mapping function. For concise expression, some expressions in Formula (12) are integrated into the variable $\hat{u}_k$ and then described by Formula (13). In this way, a calculation result of Formula (12) may be used to indicate a simplified likelihood score.

Step S106: Determine, based on the likelihood score, whether an identity of the first recognition object is consistent with an identity of the first registration object.

The likelihood score may be calculated by using the simplified likelihood ratio shown in Formula (12), or the normalized likelihood score in the recognition scenario may be calculated by using the foregoing method with reference to Formula (6). It should be understood that, with reference to Formula (9) to Formula (13), the calculation process of the likelihood score is mapped from the registration scenario to the recognition scenario, and impact caused by the mismatch between scenarios is considered, which helps improve the scoring performance. Specifically, the following may be briefly summarized: The posterior probability distribution template is calculated on the probability distribution model of the registration scenario based on the biological feature of the first registration object; the posterior probability distribution template is mapped from the registration scenario to the recognition scenario based on the mapping relationship, to obtain the mapped posterior probability distribution template; the posterior probability part is calculated on the probability distribution model of the recognition scenario based on the mapped posterior probability distribution template; the marginal probability part is calculated on the probability distribution model of the recognition scenario based on the feature of the first recognition object; and the likelihood score is obtained based on the posterior probability part and the marginal probability part.

Figure 2:
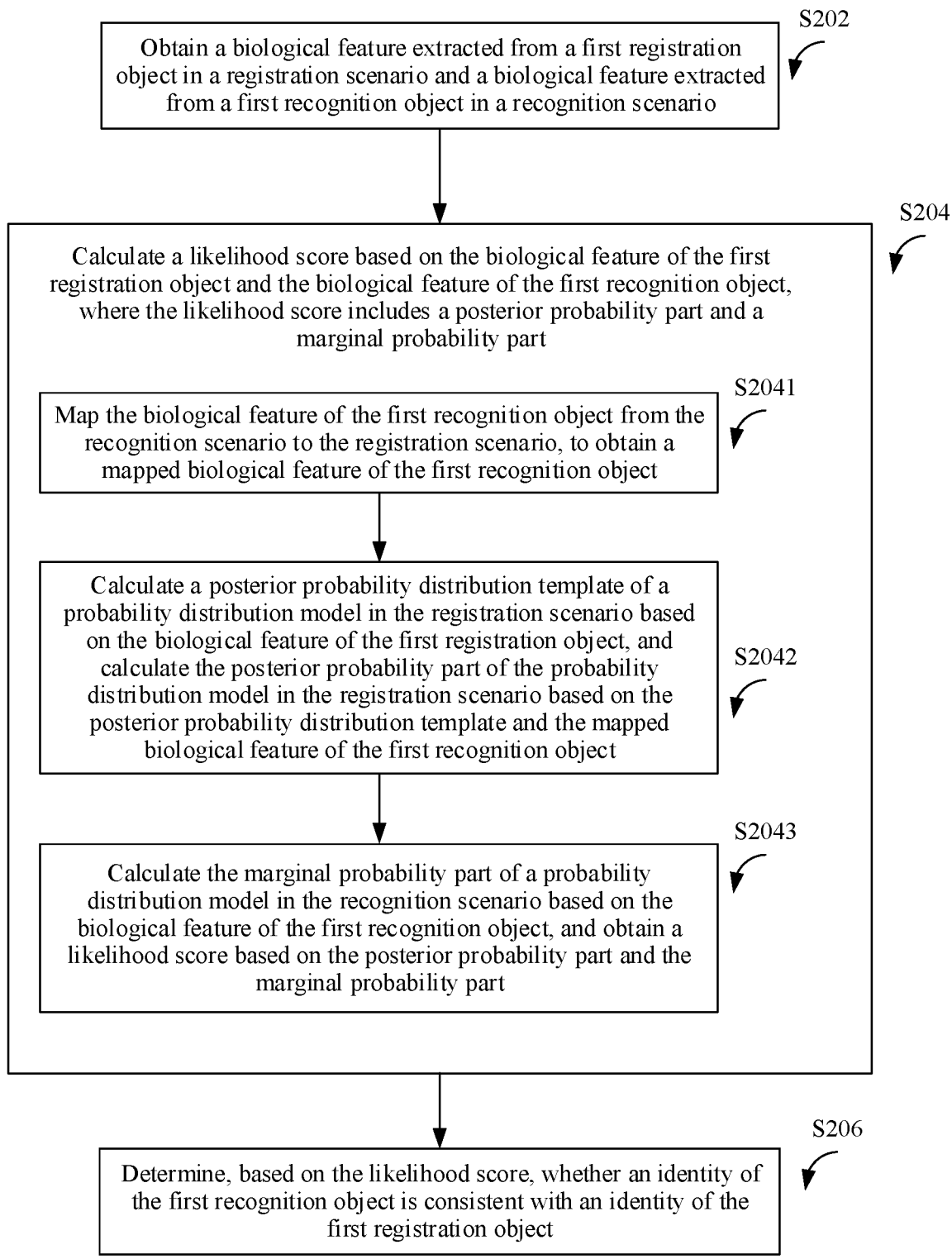
FIG. 2 is a schematic flowchart of another implementation of an identity authentication method according to an embodiment of this application.

FIG. 2 is a schematic flowchart of an identity authentication method of another implementation according to an embodiment of this application. As shown in FIG. 2, the method includes the following steps.

In actual application, to compensate for a loss of scoring performance caused by a scenario mismatch, correction may be performed in the following manner and based on a mapping relationship. Because the mapping relationship is reversible, a calculation process of a likelihood score may be mapped from a registration scenario to a recognition scenario, or the calculation process of the likelihood score may be mapped from the recognition scenario to the registration scenario. The following describes an embodiment in which the calculation process of the likelihood score is mapped from the recognition scenario to the registration scenario.

Step S202: Obtain a biological feature extracted from a first registration object in a registration scenario and a biological feature extracted from a first recognition object in a recognition scenario.

It should be understood that the biological feature may be a voiceprint feature, a facial feature, a fingerprint feature, or another biological feature used for identity authentication. The first registration object is defined as a person providing a biological feature, and the first recognition object is a person whose identity corresponds to the provided biological feature. For example, the biological feature is the voiceprint feature. The first registration object is a user who performs voiceprint feature registration in the registration scenario, or may be referred to as a speaker in the registration scenario. Correspondingly, the first recognition object is a user who performs voiceprint feature recognition in the recognition scenario, or may be referred to as a speaker in the recognition scenario.

Step S204: Calculate a likelihood score based on the biological feature of the first registration object and the biological feature of the first recognition object, where the likelihood score includes a posterior probability part and a marginal probability part.

The posterior probability part is determined based on the biological feature of the first registration object, a probability distribution model of the registration scenario, and a mapping relationship between the probability distribution model of the registration scenario and a probability distribution model of the recognition scenario. The marginal probability part is determined based on the biological feature of the first recognition object, the probability distribution model of the recognition scenario, and the mapping relationship. The probability distribution model of the registration scenario includes probability distribution parameters between different registration objects and probability distribution parameters between different samples of a same registration object when a biological feature is extracted from one or more registration objects in the registration scenario. The probability distribution model of the recognition scenario includes probability distribution parameters between different recognition objects and probability distribution parameters between different samples of a same recognition object when a biological feature is extracted from one or more recognition objects in the recognition scenario. The probability distribution model of the registration scenario may be understood as a distribution rule of the biological feature extracted in a limited space of the registration scenario. Still, for example, the biological feature is the voiceprint feature. The probability distribution model of the registration scenario may be understood as a distribution of a voiceprint feature that is of a speaker and that is extracted in the limited space of the registration scenario, or may be understood as a model used to describe a feature distribution space of voiceprint features of the entire registration scenario. In addition, there is the mapping relationship between the probability distribution model of the registration scenario and the probability distribution model of the recognition scenario. The mapping relationship may be embodied by using a mapping function, and the mapping function may be linear or non-linear. The following uses a simple linear mapping function as an example. This simple linear mapping function may be expressed as a linear function of one variable with two constants.

In this embodiment, step S204 includes step S2041: Map the biological feature of the first recognition object from the recognition scenario to the registration scenario, to obtain a mapped biological feature of the first recognition object.

There is the mapping relationship between the probability distribution model of the registration scenario and the probability distribution model of the recognition scenario. The mapping relationship may be expressed as the linear mapping function. Refer to Formula (14).

Formula (14) is the following equation:

$$x = M\hat{x} + b \tag{14}$$

In Formula (14), M and b are constants of the linear mapping function, and an optimal configuration of the linear mapping function may be obtained in a manner of machine learning training, to reflect the mapping relationship to a maximum extent. Formula (14) means the mapping from the recognition scenario to the registration scenario. $\hat{x}$ indicates the first recognition object that performs biological feature recognition in the recognition scenario, and x indicates a biological feature that maps $\hat{x}$ to the registration scenario based on the linear mapping function.

In this embodiment, step S204 further includes step S2042: Calculate a posterior probability distribution template of the probability distribution model in the registration scenario based on the biological feature of the first registration object, and calculate the posterior probability part of the probability distribution model in the registration scenario based on the posterior probability distribution template and the mapped biological feature of the first recognition object.

In terms of the posterior probability distribution template, Formula (15) is obtained by referring to Formula (4).

Formula (15) is the following equation:

$$p(\mu_k \mid x_1^k, \ldots, x_n^k) = N\left(\mu_k; \frac{n_k \epsilon}{n_k \epsilon + \sigma} \bar{x}_k, \frac{\epsilon \sigma}{n_k \epsilon + \sigma} I\right) \tag{15}$$

In Formula (15), $u_k$ indicates a biological feature that is recorded after biological feature registration is performed by the first registration object in the registration scenario, N indicates a Gaussian distribution function; $x_1^k$, $x_2^k$, $x_3^k$ to $x_{nk}^k$ indicate biological features of a plurality of different registration objects that are known, $n_k$ indicates a total quantity of different samples collected when the biological feature registration is performed by the first registration object, $\varepsilon$ indicates the probability distribution parameter between the different registration objects included in the probability distribution model of the registration scenario, I indicates a conventional diagonal matrix, $\overline{x}_k$ indicates a vector mean of all registered biological features of the first registration object in the registration scenario, and $\sigma$ indicates the probability distribution parameter between the different samples of the same registration object included in the probability distribution model of the registration scenario. It should be understood that, because the plurality of known different registration objects are obtained in the registration scenario, Formula (15) and Formula (4) are consistent in a mathematical sense. However, a function of Formula (15) herein should be understood as being used to calculate the posterior probability part of the probability distribution model in the registration scenario based on the posterior probability distribution template and the mapped biological feature of the first recognition object. Specifically, the biological feature that is calculated according to Formula (14) and that is mapped to the registration scenario according to the linear mapping function is substituted into Formula (5). In other words, x in Formula (5) is replaced with $\hat{x}$, and then Formula (5) is expanded to obtain Formula (16).

Formula (16) is the following equation:

$$p_k(\hat{x}; M, b) = p(M\hat{x} + b \mid x_1^k, \ldots, x_n^k) \quad (16)$$

$$= \int p(M\hat{x} + b \mid \mu_k) p(\mu_k \mid x_1^k, \ldots, x_n^k) d\mu_k$$

$$= N\left(M\hat{x} + b; \frac{n_k \epsilon}{n_k \epsilon + \sigma} \overline{x}_k, \left(\sigma + \frac{\epsilon \sigma}{n_k \epsilon + \sigma}\right)I\right)$$

In Formula (16), N indicates the Gaussian distribution function, $u_k$ indicates the biological feature that is recorded after the biological feature registration is performed by the first registration object in the registration scenario, $x_1^k$, $x_1^k$, $x_3^k$ to $x_{nk}^k$ indicate the biological features of the plurality of different registration objects that are known, $n_k$ indicates the total quantity of different samples collected when the biological feature registration is performed by the first registration object, $\varepsilon$ indicates the probability distribution parameter between the different registration objects included in the probability distribution model of the registration scenario, I indicates the conventional diagonal matrix, x indicates the first registration object that performs the biological feature registration in the registration scenario, $\sigma$ indicates the probability distribution parameter between the different samples of the same registration object included in the probability distribution model of the registration scenario, $\overline{x}_k$ indicates the vector mean of all registered biological features of the first registration object in the registration scenario, $\hat{x}$ indicates the first recognition object that performs the biological feature recognition in the recognition scenario, and M and b are the constants of the linear mapping function. It can be seen that, Formula (16) after expansion is based on Formula (15) and Formula (3). Formula (16) means that, on condition that the biological features of the plurality of different registration objects $x_1^k$, $x_2^k$, $x_3^k$ to $x_{nk}^k$ are known, a probability that the first recognition object is c after the biological feature recognition is performed in the recognition scenario.

In this embodiment, step S204 further includes step S2043: Calculate the marginal probability part of the probability distribution model in the recognition scenario based on the biological feature of the first recognition object; and obtain the likelihood score based on the posterior probability part and the marginal probability part.

Refer to Formula (6). x in Formula (6) is replaced with $\hat{x}$, Formula (6) is expanded, and it may be learned that the marginal probability part of the likelihood score is obtained with reference to Formula (17).

Formula (17) is the following equation:

$$p(\hat{x}) = N(\hat{x}; 0, (\hat{\epsilon} + \hat{\sigma})I) \quad (17)$$

In Formula (17), $\hat{x}$ indicates the first recognition object that performs the biological feature recognition in the recognition scenario, $\hat{\epsilon}$ indicates the probability distribution parameter between the different recognition objects included in the probability distribution model of the recognition scenario, and $\hat{\sigma}$ indicates the probability distribution parameter between the different samples of the same recognition object included in the probability distribution model of the recognition scenario.

In terms of a normalized likelihood score, refer to Formula (6), except that the posterior probability part of the normalized likelihood score is calculated according to Formula (16), and the marginal probability part of the normalized likelihood score is calculated according to Formula (17).

A likelihood score NL in the registration scenario may be calculated based on a likelihood ratio in the Gaussian distribution, and converted into Formula (18).

Formula (18) is the following equation:

$$\log NL(\hat{x} \mid k) \propto -\frac{1}{\sigma + \frac{\epsilon \sigma}{n_k \epsilon + \sigma}} \|M\hat{x} + b - \overline{\mu}_k\|^2 + \frac{1}{\hat{\epsilon} + \hat{\sigma}} \|\hat{x}\|^2, \quad (18)$$

In Formula (18), $\hat{x}$ indicates the first recognition object that performs the biological feature recognition in the recognition scenario, k indicates a specific category to which the recognized biological feature of the first recognition object belongs, $\hat{\epsilon}$ indicates the probability distribution parameter between the different recognition objects included in the probability distribution model of the recognition scenario, $\hat{\sigma}$ indicates the probability distribution parameter between the different samples of the same recognition object included in the probability distribution model of the recognition scenario, $n_k$ indicates the total quantity of different samples collected when the biological feature registration is performed by the first registration object, $\varepsilon$ indicates the probability distribution parameter between the different registration objects included in the probability distribution model of the registration scenario, I indicates the conventional diagonal matrix, $\overline{x}_k$ indicates the vector mean of all registered biological features of the first registration object in the registration scenario, $\sigma$ indicates the probability distribution parameter between the different samples of the same registration object included in the probability distribution model of the registration scenario, and M and b are the constants of the linear mapping function.

Step S206: Determine, based on the likelihood score, whether an identity of the first recognition object is consistent with an identity of the first registration object.

The likelihood score may be calculated by using the simplified likelihood ratio shown in Formula (18), or the normalized likelihood NL score in the registration scenario may be calculated by using the foregoing method with reference to Formula (6). It should be understood that, with reference to Formula (14) to Formula (18), the calculation process of the likelihood score is mapped from the recognition scenario to the registration scenario, and impact caused by the mismatch between scenarios is considered, which helps improve the scoring performance. Specifically, the following may be briefly summarized: The biological feature of the first recognition object is mapped from the recognition scenario to the registration scenario based on the mapping relationship, to obtain the mapped biological feature of the first recognition object; the posterior probability distribution template is calculated on the probability distribution model of the registration scenario based on the biological feature of the first registration object; the posterior probability part is calculated on the probability distribution model of the registration scenario based on the posterior probability distribution template and the mapped biological feature of the first recognition object; the marginal probability part is calculated on the probability distribution model of the recognition scenario based on the biological feature of the first recognition object; and the likelihood score is obtained based on the posterior probability part and the marginal probability part.

In a possible implementation, for the mapping relationship between the probability distribution model of the registration scenario and the probability distribution model of the recognition scenario, refer to Formula (14). However, when both the probability distribution parameter k between the different recognition objects included in the probability distribution model of the recognition scenario and the probability distribution parameter E between the different registration objects included in the probability distribution model of the registration scenario are small, the linear mapping relationship of Formula (14) may be simplified as global displacement. For details, refer to Formula (19).

Formula (19) is the following equation:

$$x = \hat{x} + b \quad (19)$$

In Formula (19), b is a global displacement amount, and the optimal configuration of the linear mapping function may be obtained in the manner of the machine learning training, to reflect the mapping relationship to a maximum extent. Formula (19) means the mapping from the recognition scenario to the registration scenario. $\hat{x}$ indicates the first recognition object that performs the biological feature recognition in the recognition scenario, and x indicates the biological feature that maps $\hat{x}$ to the registration scenario based on the linear mapping function.

Calculation of the simplified likelihood ratio may be obtained according to Formula (19) and with reference to Formula (15) to Formula (18). For details, refer to Formula (20).

Formula (20) is the following equation:

$$\log NL(\hat{x} \mid k) \propto -\frac{1}{\sigma + \frac{\epsilon\sigma}{n_k\epsilon + \sigma}}\|\hat{x} + b - \bar{\mu}_k\|^2 + \frac{1}{\epsilon + \sigma}\|\hat{x} + b\|^2, \quad (20)$$

In Formula (20), x indicates the first recognition object that performs the biological feature recognition in the recognition scenario, k indicates the specific category to which the recognized biological feature of the first recognition object belongs, $\hat{\epsilon}$ indicates the probability distribution parameter between the different recognition objects included in the probability distribution model of the recognition scenario, $\hat{\sigma}$ indicates the probability distribution parameter between the different samples of the same recognition object included in the probability distribution model of the recognition scenario, $n_k$ indicates the total quantity of different samples collected when the biological feature registration is performed by the first registration object, $\epsilon$ indicates the probability distribution parameter between the different registration objects included in the probability distribution model of the registration scenario, I indicates the conventional diagonal matrix, $\bar{x}_k$ indicates the vector mean of all registered biological features of the first registration object in the registration scenario, a indicates the probability distribution parameter between the different samples of the same registration object included in the probability distribution model of the registration scenario, and b is the global displacement amount.

Still refer to FIG. 1 and FIG. 2. The mapping function used to reflect the reversible mapping relationship between the probability distribution model of the registration scenario and the probability distribution model of the recognition scenario may be a linear analytical solution, or may be a non-linear mapping relationship obtained by using a numerical solution or a neural network algorithm. The following briefly describes a method for training a mapping function: A feature distribution in the registration scenario is estimated based on registration training data; a feature distribution in the recognition scenario is estimated based on recognition training data; according to a mapping function and based on the registration training data and the recognition training data, a loss function based on a criterion for maximum likelihood estimation is calculated, where the mapping function is used for reversible mapping between the feature distribution in the registration scenario and the feature distribution in the recognition scenario; and a parameter of the mapping function is adjusted according to the loss function until the loss function satisfies loss converge, to obtain the trained mapping function.

Refer to FIG. 2 and Formula (14). In Formula (14), M and b are the constants of the linear mapping function, and the optimal configuration of the linear mapping function may be obtained in the manner of the machine learning training, to reflect the mapping relationship to a maximum extent. Therefore, for the mapping function of Formula (14), a loss function shown in Formula (21) may be designed.

Formula (21) is the following equation:

$$\mathcal{L}(M, b) = \sum_{k=1}^{K} \sum_{i=1}^{N} p_k(\hat{x}_i; M, b) \quad (21)$$

In Formula (21), x indicates the first recognition object that performs the biological feature recognition in the recognition scenario, K indicates a total quantity of different registration objects, and N indicates a total quantity of biological feature samples for each registration object. By using the loss function shown in Formula (21), learning an optimal mapping function may be implemented by using a machine learning model used for a maximum likelihood probability linear regression (MLLR) task or a training method based on the criterion for maximum likelihood estimation.

Still refer to FIG. 1 and FIG. 2. In a possible implementation, a change in a biological feature distribution caused by a change of the recognition object needs to be considered, and a related model needs to be updated based on the change. Therefore, a likelihood probability score of a mismatch between the registration and recognition scenario caused by the change of the recognition object is corrected. For example, in the biological feature recognition process, a high-probability biological feature that passes may be filtered, and a dynamic update method may be used to update a biological feature distribution of a specific registration object. Specific steps include: Biological features extracted from a plurality of samples of a second recognition object are obtained in the recognition scenario, and likelihood scores separately corresponding to the plurality of samples of the second recognition object are calculated; based on the likelihood scores separately corresponding to the plurality of samples of the second recognition object, a feature used for status update is selected from the biological features extracted from the plurality of samples of the second recognition object; and by using the feature used for the status update, the probability distribution parameters between the different samples of the same recognition object that are included in the probability distribution model of the recognition scenario are updated. For the corrected likelihood score, refer to Formula (22).

Formula (22) is the following equation:

$$\log NL(x \mid k) \propto -\frac{1}{\hat{\sigma} + \frac{\epsilon \sigma}{n_k \epsilon + \sigma}} \|x - \hat{\mu}_k\|^2 + \frac{1}{\epsilon + \hat{\sigma}} \|x\|^2, \quad (22)$$

In Formula (22), NL indicates the normalized likelihood, $\tilde{u}_k$ is the variable set for concise expression, and refer to Formula (8), $n_k$ indicates the total quantity of different samples collected when the biological feature registration is performed by the first registration object, $\epsilon$ indicates the probability distribution parameter between the different registration objects included in the probability distribution model of the registration scenario, x indicates the first registration object that performs the biological feature registration in the registration scenario, $\sigma$ indicates the probability distribution parameter between the different samples of the same registration object included in the probability distribution model of the registration scenario, and $\hat{\sigma}$ indicates the probability distribution parameter between the different samples of the same recognition object included in the probability distribution model of the recognition scenario. The corrected likelihood score may be obtained by using Formula (22), so that the distribution parameter is adjusted and updated based on the biological features of the plurality of samples of the second recognition object, which facilitates dynamic adjustment and update based on the change of the recognition object.

In some example embodiments, to reflect likelihood scoring results corresponding to different statuses of a same object, in a process of continuously collecting biological features of a user, a clustering algorithm may be used to cluster the biological features of the user in a to-be-updated feature pool, and maintain a plurality of models and distributions for the user. Commonly used clustering algorithms include a k-means algorithm, a Gaussian mixture model (Gaussian Mixture Model, GMM), and the like. It may be understood that a user submodel clustered according to the clustering algorithm may indicate different statuses of speaking of a specific user. During recognition, scoring results of a plurality of submodels are fused to obtain a more stable recognition result. Specific steps include: by using a clustering algorithm, the probability distribution parameters between the different samples of the same recognition object included in the probability distribution model of the recognition scenario are clustered to obtain a plurality of submodels, where the plurality of submodels separately correspond to different statuses of the same recognition object; and the marginal probability part of the likelihood score is fused with scoring results of the plurality of submodels. In this way, scoring fusion is implemented by using the clustering algorithm, so that adjustment is made based on the different statuses of the same recognition object.

Figure 3:
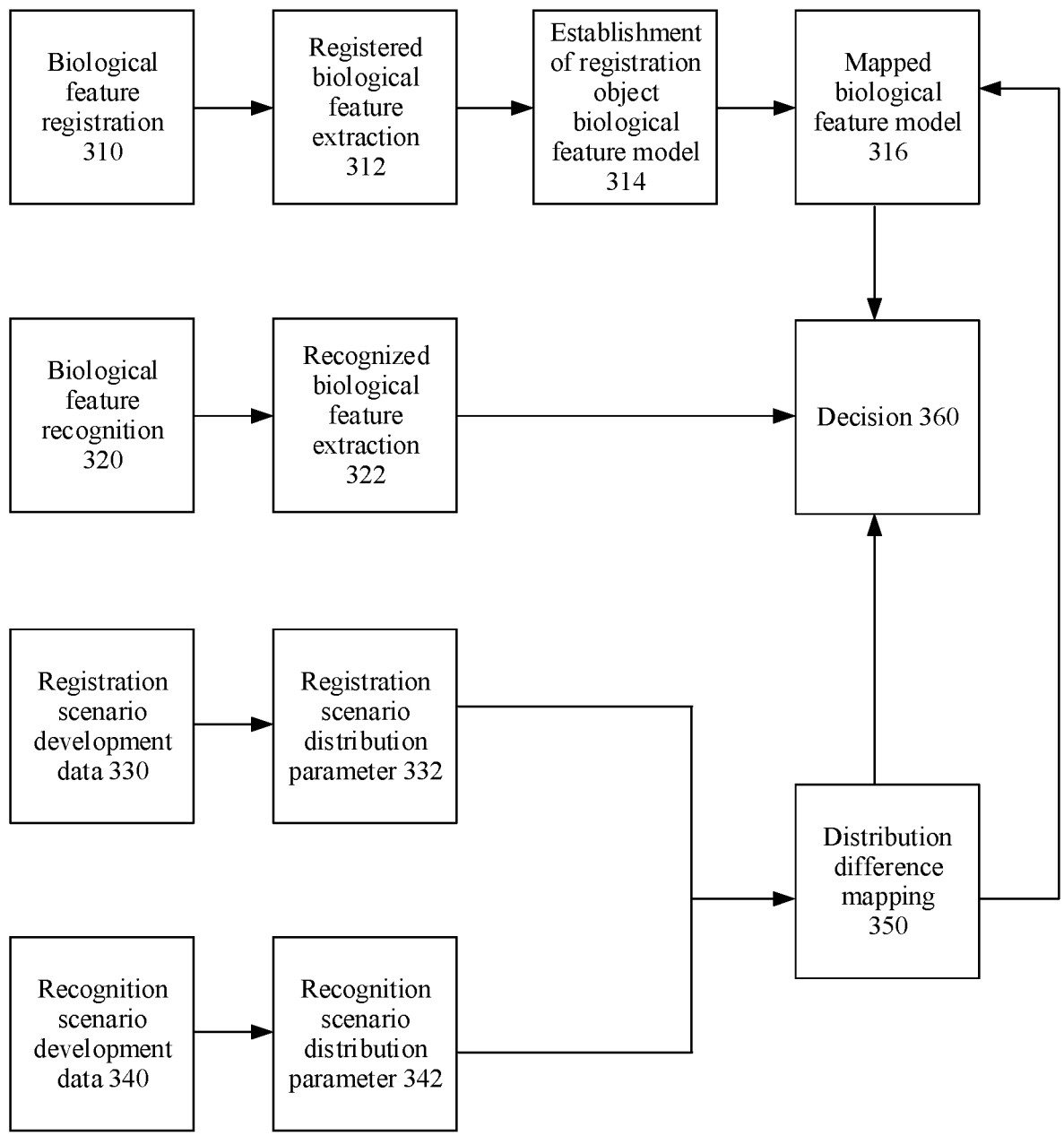
FIG. 3 is a schematic diagram of performing identity authentication based on registration and recognition of a biological feature according to an embodiment of this application.

FIG. 3 is a schematic diagram of performing identity authentication based on registration and recognition of a biological feature according to an embodiment of this application. It should be understood that the biological feature may be a voiceprint feature, a facial feature, a fingerprint feature, or another biological feature used for identity authentication. A registration object is defined as a person providing a biological feature, and a recognition object is a person whose identity corresponds to the provided biological feature. For example, the biological feature is the voiceprint feature. The registration object is a user who performs voiceprint feature registration in a registration scenario, or may be referred to as a speaker in the registration scenario.

Distribution difference mapping 350 in FIG. 3 refers to a distribution difference between a probability distribution model of a registration scenario and a probability distribution model of a recognition scenario, and the distribution difference needs to be corrected in decision 360. Therefore, a calculation process of a likelihood score needs to be mapped from the registration scenario to the recognition scenario, or the calculation process of the likelihood score needs to be mapped from the recognition scenario to the registration scenario by using a mapping relationship between the probability distribution model of the registration scenario and the probability distribution model of the recognition scenario. In other words, the decision 360 needs to be adjusted based on the distribution difference mapping 350. It is assumed that the mapping relationship may be expressed as a linear mapping function, and refer to Formula (9) or Formula (14). Therefore, with reference to Formula (9) to Formula (13), the calculation process of the likelihood score may be mapped from the registration scenario to the recognition scenario, or with reference to Formula (14) to Formula (18), the calculation process of the likelihood score may be mapped from the recognition scenario to the registration scenario.

Still refer to FIG. 3. The registration scenario and the recognition scenario may be understood as two relative environments separately corresponding to different feature space distributions. In a registration phase, a plurality of registration objects register biological features 310, and then registered biological feature extraction 312 is performed. Based on the extracted biological feature, establishment of a registration object biological feature model 314 is performed. The biological feature model may also be understood as a user archive, and is used to correspond an identity of the user to a biological feature of the user, to authenticate the identity and authenticate the biological feature in a recognition phase. In the recognition phase, biological feature recognition 320 of a to-be-recognized object is performed, a biological feature is extracted from the recognized biological feature of the to-be-recognized object, and then the decision 360 is performed. When the registration scenario and the recognition scenario do not match, that is, a mismatch occurs, this means that the probability distribution model or a probability distribution function of the feature space distribution of the biological feature in the registration scenario is different from the probability distribution model or a distribution function of the feature space distribution corresponding to the recognition scenario. For example, it is assumed that biological features of a specific object in the registration scenario and the recognition scenario meet a Gaussian distribution rule, which may be represented as a specific Gaussian distribution function, and two parameters, a mean and a variance, of the Gaussian distribution function, are different from those of another Gaussian distribution function. In addition, biological features of different objects in a same feature space may also be represented as a specific Gaussian distribution function, and have two corresponding parameters: a mean and a variance. The mismatch between the registration scenario and the recognition scenario may also be understood as that feature spaces of the registration scenario and the recognition scenario are statistically inconsistent. As a result, effect of direct similarity comparison is poor, and a performance loss is easily caused. The mismatch between the registration scenario and the recognition scenario is caused by various reasons, which may be caused by differences caused by external impact, such as a channel, an environment, and a sound pickup distance, or may be caused by a change of a user or a speaker, such as a change of a voice of the user with time or a change of a speaking mode or a speaking status.

Still refer to FIG. 3. To cope with impact brought by the mismatch between the registration scenario and the recognition scenario, registration scenario development data 330 is used to estimate a registration scenario distribution parameter 332, that is, a distribution parameter of the biological feature in the feature space corresponding to the registration scenario. Recognition scenario development data 340 is also used to estimate a recognition scenario distribution parameter 342, that is, a distribution parameter of the biological feature in the feature space corresponding to the recognition scenario. Specifically, an initial probability distribution model of the registration scenario and an initial probability distribution model of the recognition scenario are respectively obtained by using the development data adapted to the registration scenario and the development data adapted to the recognition scenario. According to the initial probability distribution model of the registration scenario and the initial probability distribution model of the recognition scenario, the distribution difference mapping 350 is obtained, for example, represented as a corresponding distribution difference mapping function. Then, the distribution difference mapping function is trained by using a criterion for maximum likelihood estimation, to obtain the trained distribution difference mapping function. The trained distribution difference mapping function is used to improve the decision 360. In other words, first, the multi-scenario development data is used to model the distributions of the biological features in the registration scenario and the recognition scenario. Then, a machine learning method is used to learn a distribution difference mapping model of the mismatch between the registration scenario and the recognition scenario. During user recognition, the established distribution difference mapping model is used to map the user features in the registration phase and recognition phase to a same space distribution that matches each other for similarity comparison, to solve the impact brought by the mismatch between the registration scenario and the recognition scenario. In another aspect, the registration object biological feature mode 314 established in the registration phase may be mapped, with reference to the function corresponding to the distribution difference mapping 350, to a space that matches the recognition scenario, to obtain a mapped biological feature model 316, and then the decision 360 is performed. In a possible implementation, the function corresponding to the distribution difference mapping 350 may be designed by using Formula (22).

Figure 4:
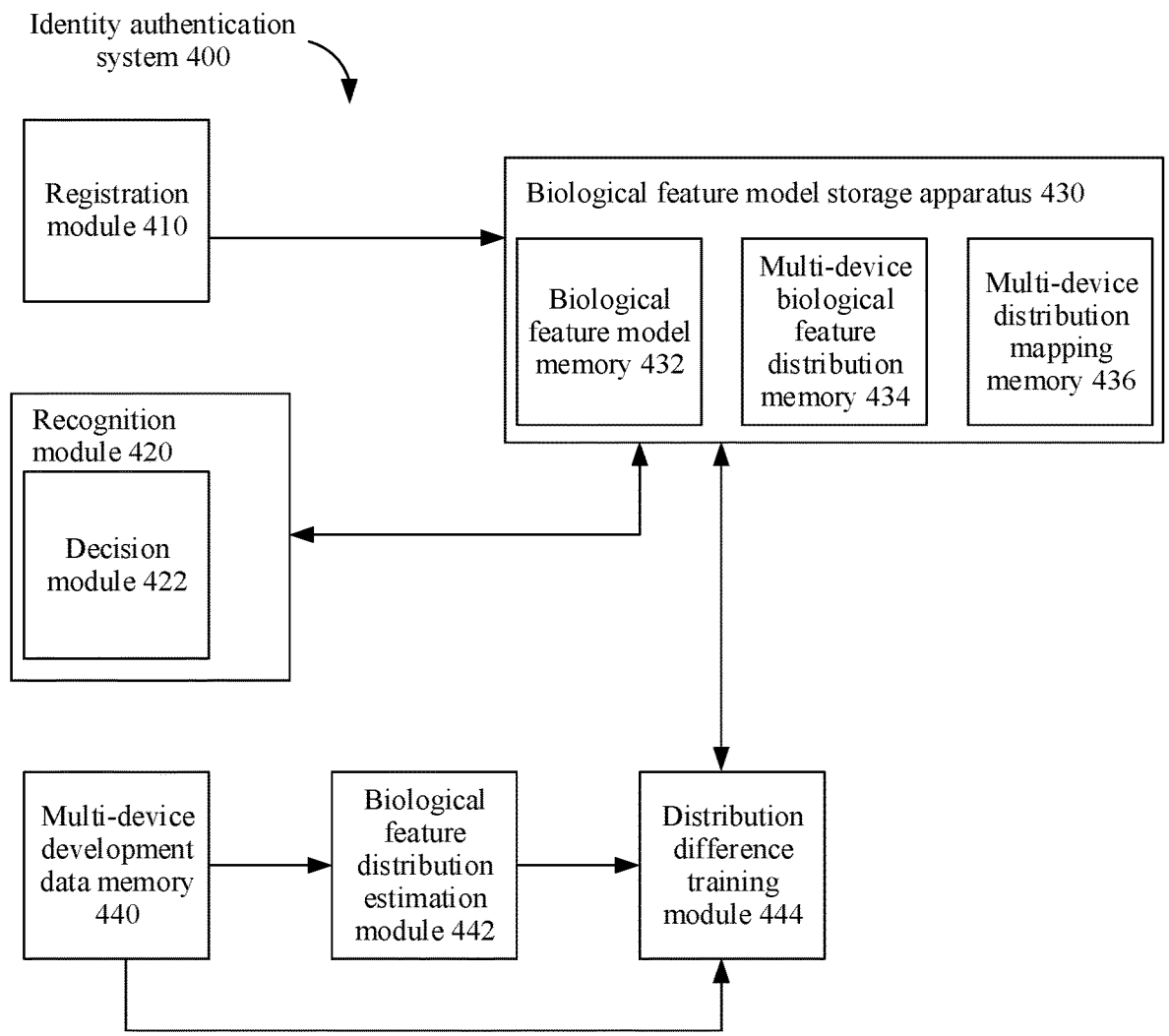
FIG. 4 is a block diagram of a structure of an identity authentication system according to an embodiment of this application.

FIG. 4 is a block diagram of a structure of an identity authentication system according to an embodiment of this application. It should be understood that a biological feature may be a voiceprint feature, a facial feature, a fingerprint feature, or another biological feature used for identity authentication. A registration object is defined as a person providing a biological feature, and a recognition object is a person whose identity corresponds to the provided biological feature. For example, the biological feature is the voiceprint feature. The registration object is a user who performs voiceprint feature registration in a registration scenario, or may be referred to as a speaker in the registration scenario.

A distribution difference training module 444 in FIG. 4 refers to a mapping relationship that is obtained by using a deep machine learning technology, for example, a neural network algorithm, and that indicates a statistical distribution difference in feature spaces of a registration scenario and a recognition scenario. As shown in FIG. 4, an identity authentication system 400 includes a registration module 410, a recognition module 420, a biological feature model storage apparatus 430, a multi-device development data memory 440, a biological feature distribution estimation module 442, and the distribution difference training module 444. The registration module 410 may be deployed on a registration device to enable a user to register a biological feature, or may be deployed in a cloud to enable the user to register, and the following steps are included: The biological feature of the user is collected by using the registration device, the biological feature is extracted from the registration device by using a feature extractor, a model is established based on the extracted biological feature and a user ID or another identity credential is bound, and finally the biological feature model obtained by the user through the registration by using the registration device is transmitted to the biological feature model storage apparatus 430 for network cloud storage. The extractor may be a deep neural network model trained with a large quantity of user voices unrelated to the registration device. The recognition module 420 may be deployed on a recognition device to enable the user to perform biological feature recognition, and the following steps are included: A biological feature of the user is collected by using the recognition device, the biological feature is extracted from the recognition device by using the extractor, the registered biological feature model of the user is loaded from a connected cloud storage, and finally likelihood scoring decision is performed. The recognition module 420 may further determine a matching status between the user recognition device and the registration device in advance, that is, determine a factor that may affect scoring performance, such as a channel difference between the two devices. When it is determined that the registration device matches the recognition device, a decision may be made directly based on a likelihood score. When it is determined that the registration device and the recognition device do not match, a distribution difference mapping model that is obtained through training in advance may be invoked to perform corrected likelihood score calculation, and finally, the decision is made based on the corrected likelihood score. The corrected likelihood score calculation may be performed by a decision module 422.

Still refer to FIG. 4. The biological feature model storage apparatus 430 includes a biological feature model memory 432, a multi-device biological feature distribution memory 434, and a multi-device distribution mapping memory 436. The biological feature model memory 432 is communicatively connected to the registration module 410, and receives the biological feature model that is obtained through the registration by using the registration device. The multi-device biological feature distribution memory 434 and the multi-device distribution mapping memory 436 are connected to the distribution difference training module 444, and provide biological feature distributions and distribution mapping models that are obtained through training in advance and that are for the plurality of devices. The distribution difference training module 444 trains, for example, through a criterion for maximum likelihood estimation, a distribution difference mapping function with the registration device for a device on which cross-device biological feature recognition needs to be performed. Specifically, multi-scenario development data stored in the multi-device development data memory 440 may be loaded, and after modeling is performed on the distributions of the biological features in the registration scenario and the recognition scenario by using the biological feature distribution estimation module 442, a distribution difference mapping model of a mismatch between the registration scenario and the recognition scenario is learned by using the distribution difference training module 444, to resolve impact brought by the mismatch between the registration scenario and the recognition scenario. It should be understood that the multi-device biological feature distribution memory 434 and the multi-device distribution mapping memory 436 shown in FIG. 4 are applicable to a cross-device, that is, a multi-device or multi-channel application scenario. The mismatch in the cross-device or multi-channel scenario may also be considered by using the biological feature distributions and the distribution mapping models that are obtained through training in advance and that are for the plurality of devices.

Still refer to FIG. 4. The registration module 410, the recognition module 420, and the biological feature model storage apparatus 430 may be separately deployed in different places, may be located in a same place, or may be in another possible combination. For example, the registration module 410 and the recognition module 420 may be respectively located in the registration scenario and the recognition scenario, and the biological feature model storage apparatus 430 may be a cloud storage apparatus disposed in a cloud or a local storage apparatus. In a scenario in which the biological feature model storage apparatus 430 in a cloud storage manner is used to store the biological feature distributions and the distribution mapping functions of the plurality of devices, the registration device and the recognition device can be separated, and registration and recognition in different places and at different time points can be completed by using the biological feature model storage apparatus 430, to improve system efficiency. In another aspect, the multi-device development data memory 440, the biological feature distribution estimation module 442, and the distribution difference training module 444 may be separately disposed from the biological feature model storage apparatus 430, so that the training process can be independently completed. In addition, it should be understood that the decision module 422 shown in FIG. 4 is deployed in the recognition module 420, and that is because in most application scenarios, a likelihood scoring result needs to be provided and identity authentication needs to be performed after the recognition module 420 collects the biological feature of the user. However, in a possible implementation, the decision module 422 may alternatively be separately disposed, that is, the recognition module 420 collects only the biological feature in the recognition scenario. Centrally collected biological features in the recognition scenario may be centrally processed by using the decision module 422 in a subsequent period of time.

The identity authentication system 400 shown in FIG. 4 may be configured to implement the method shown in FIG. 1 or FIG. 2. Specifically, the registration module 410 is configured to obtain a biological feature extracted from a first registration object in a registration scenario; the recognition module 420 is configured to obtain a biological feature extracted from a first recognition object in a recognition scenario, and the decision module 422 is configured to: calculate a likelihood score based on the biological feature of the first registration object and the biological feature of the first recognition object, and determine, based on the likelihood score, whether an identity of the first recognition object is consistent with an identity of the first registration object. The likelihood score includes a posterior probability part and a marginal probability part; the posterior probability part is determined based on the biological feature of the first registration object, a probability distribution model of the registration scenario, and a mapping relationship between the probability distribution model of the registration scenario and a probability distribution model of the recognition scenario; the probability distribution model of the registration scenario includes probability distribution parameters between different registration objects and probability distribution parameters between different samples of a same registration object when a biological feature is extracted from one or more registration objects in the registration scenario, and the probability distribution model of the recognition scenario includes probability distribution parameters between different recognition objects and probability distribution parameters between different samples of a same recognition object when a biological feature is extracted from one or more recognition objects in the recognition scenario; and the marginal probability part is determined based on the biological feature of the first recognition object, the probability distribution model of the recognition scenario, and the mapping relationship.

Figure 5:
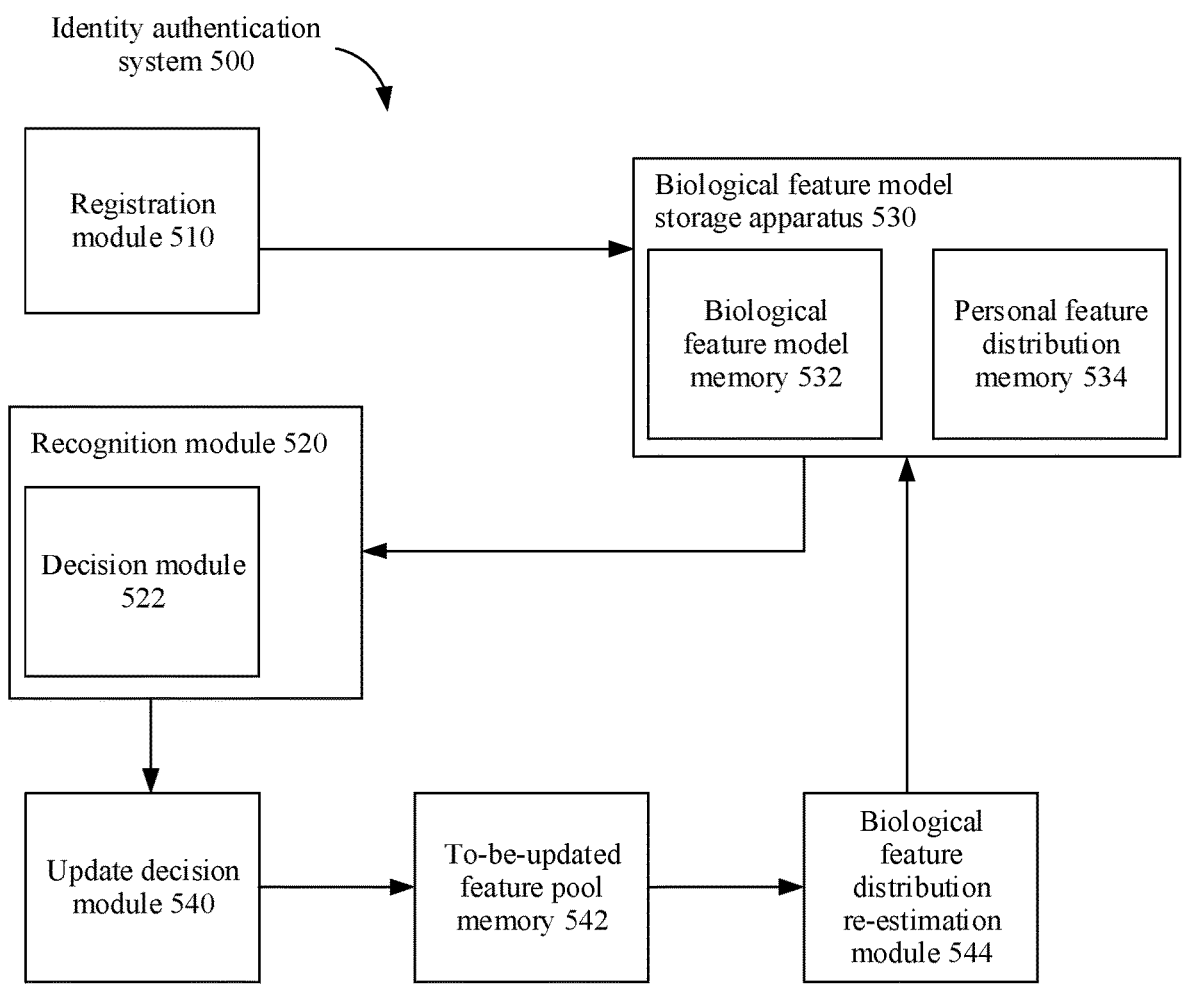
FIG. 5 is a block diagram of a structure of an identity authentication system for dynamically matching a change of a user according to an embodiment of this application.

FIG. 5 is a block diagram of a structure of an identity authentication system for dynamically matching a change of a user according to an embodiment of this application. It should be understood that a biological feature may be a voiceprint feature, a facial feature, a fingerprint feature, or another biological feature used for identity authentication. A registration object is defined as a person providing a biological feature, and a recognition object is a person whose identity corresponds to the provided biological feature. For example, the biological feature is the voiceprint feature. The registration object is a user who performs voiceprint feature registration in a registration scenario, or may be referred to as a speaker in the registration scenario.

A decision module 522 in FIG. 5 may implement the calculation process of the likelihood score shown in FIG. 1 or FIG. 2. In actual application, a mismatch between a registration scenario and a recognition scenario may be caused due to the change of the user. Considering that a status of the user changes in real time, and a change of a biological feature distribution model is caused due to impact of a mood, a posture, and a speaking speed of the user, a biological feature distribution model that dynamically matches a current status of the user is required. In combination with an update decision module 540 and the decision module 522 in FIG. 5, a user feature that needs to be updated may be selected, the user feature is stored in a to-be-updated feature memory 542, and after the user feature is updated by using a biological feature distribution re-estimation module 544, the updated personal feature of the user is stored in a personal feature distribution memory 534, to correct a likelihood scoring result provided by a recognition module 520.

Still refer to FIG. 5. An identity authentication system 500 includes a registration module 510, the recognition module 520, a biological feature model storage apparatus 530, the personal feature distribution memory 534, the update decision module 540, the to-be-updated feature memory 542, and the biological feature distribution re-estimation module 544. The registration module 510 may be deployed on a registration device to enable the user to register, and the following steps are included: A biological feature of the user is collected by using the registration device, the biological feature is extracted from the registration device by using a feature extractor, a biological feature model is established based on the extracted biological feature and a user ID or another identity credential is bound, and finally, the biological feature model obtained by the user through the registration by using the registration device is transmitted to the biological feature model storage apparatus 530 for storage. The recognition module 520 may be deployed on a recognition device to enable the user to perform recognition by using a voice, or may be deployed in a cloud for the user to perform the recognition, and the following steps are included: A biological feature of the user is collected by using the recognition device, the biological feature is extracted from the recognition device by using the feature extractor, the registered biological feature model of the user is loaded from a connected biological feature model memory 532, and finally likelihood scoring is performed by using the decision module. The biological feature of the user is a user behavior feature, and is easily affected by speech content of the user, a time change, and a speaking mode. In addition, only a small quantity of features are used during the user registration, so that the registered biological feature can indicate, to a large extent, only a biological feature of the user in a state at the time of the registration. However, during the recognition, a change of a situation of the user also affects recognition effect, which may cause the mismatch between the registration scenario and the recognition scenario.

In some example embodiments, the decision module 522 is further configured to: obtain biological features extracted from a plurality of samples of a second recognition object in the recognition scenario, and calculate likelihood scores separately corresponding to the plurality of samples of the second recognition object; select, based on the likelihood scores separately corresponding to the plurality of samples of the second recognition object, a feature used for status update from the biological features extracted from the plurality of samples of the second recognition object; and update, by using the feature used for the status update, probability distribution parameters between different samples of a same recognition object included in a probability distribution model of the recognition scenario.

A specific embodiment provided in this application may be implemented by any one or a combination of hardware, software, firmware, or a solid-state logic circuit, and may be implemented with reference to signal processing, control, and/or a dedicated circuit. The device or the apparatus provided in a specific embodiment of this application may include one or more processors (for example, a microprocessor, a controller, a digital signal processor (DSP), an application-specific integrated circuit (ASIC), or a field programmable gate array (FPGA)). These processors process various computer executable instructions to control an operation of the device or the apparatus. The device or the apparatus provided in a specific embodiment of this application may include a system bus or a data transmission system that couples all components together. The system bus may include any one of different bus structures or any combination of different bus structures, for example, a memory bus or a memory controller, a peripheral bus, a universal serial bus, and/or a processor or a local bus that uses any one of the plurality of bus structures. The device or the apparatus provided in a specific embodiment of this application may be provided separately, may be a part of a system, or may be a part of another device or apparatus.

A specific embodiment provided in this application may include a computer-readable storage medium or be in combination with a computer-readable storage medium, for example, one or more storage devices that can provide non-temporary data storage. The computer-readable storage medium/storage device may be configured to store data, a programmer, and/or instructions. The device or the apparatus is enabled to implement related operations by using the data, the programmer, and/or the instructions when a processor of the device or the apparatus provided in the specific embodiment of this application executes the data, the programmer, and/or the instructions. The computer-readable storage medium/storage device may include one or more of the following features: volatile, non-volatile, dynamic, static, readable/writable, read-only, random access, sequential access, location addressable, file addressable, and content addressable. In one or more example embodiments, the computer-readable storage medium/storage device may be integrated into a device or an apparatus provided in a specific embodiment of this application, or belong to a common system. The computer-readable storage medium/ storage device may include an optical storage device, a semiconductor storage device, a magnetic storage device, and/or the like; or may include a random access memory (RAM), a flash memory, a read-only memory (ROM), an erasable programmable read-only memory (EPROM), an electrically erasable programmable read-only memory (EEPROM), a register, a hard disk, a removable magnetic disk, a recordable and/or rewritable compact disk (CD), a digital versatile disc (DVD), a massive storage device, or an appropriate storage medium in any other form.

The foregoing is implementations of embodiments of this application. It should be noted that the steps of the method in a specific embodiment of this application may be adjusted in sequence, combined, or deleted based on an actual requirement. In the foregoing embodiments, the description of each embodiment has respective focuses. For a part that is not described in detail in an embodiment, refer to related descriptions in other embodiments. It may be understood that the structure shown in the accompanying drawings and embodiments of this application does not constitute a specific limitation on the related apparatus or system. In some other embodiments of this application, the related apparatus or system may include more or fewer components than those shown in the specific embodiments and the accompanying drawings, or combine some components, or split some components, or have different component arrangements. A person skilled in the art understands that various adjustments or changes may be made to operations and details of the method and the device layout recorded in the specific embodiments without departing from the scope of the specific embodiments of this application; and several improvements and polishing may be further made without departing from the principle of embodiments of this application. These improvements and polishing shall fall within the protection scope of this application.

What is claimed is:

1. An identity authentication method, wherein the method is applied to an electronic device and comprises:
   obtaining a biological feature extracted from a first registration object in a registration scenario;
   obtaining a biological feature extracted from a first recognition object in a recognition scenario;
   determining a likelihood score based on the biological feature of the first registration object and the biological feature of the first recognition object; and
   determining, based on the likelihood score, whether an identity of the first recognition object is consistent with an identity of the first registration object, wherein
   the likelihood score comprises a posterior probability part and a marginal probability part;
   the posterior probability part is determined based on the biological feature of the first registration object, a probability distribution model of the registration scenario, and a mapping relationship between the probability distribution model of the registration scenario and a probability distribution model of the recognition scenario;
      the probability distribution model of the registration scenario comprises probability distribution parameters between different registration objects and probability distribution parameters between different samples of a same registration object, based on a biological feature being extracted from one or more registration objects in the registration scenario,
      the probability distribution model of the recognition scenario comprises probability distribution parameters between different recognition objects and probability distribution parameters between different samples of a same recognition object, based on a biological feature being extracted from one or more recognition objects in the recognition scenario; and
   the marginal probability part is determined based on the biological feature of the first recognition object, the probability distribution model of the recognition scenario, and the mapping relationship.

2. The method according to claim 1, wherein the determining the likelihood score based on the biological feature of the first registration object and the biological feature of the first recognition object comprises:
   mapping the biological feature of the first recognition object from the recognition scenario to the registration scenario based on the mapping relationship, to obtain a mapped biological feature of the first recognition object;
   determining a posterior probability distribution template of the probability distribution model in the registration scenario based on the biological feature of the first registration object;
   determining the posterior probability part of the probability distribution model in the registration scenario based on the posterior probability distribution template and the mapped biological feature of the first recognition object;
   determining the marginal probability part of the probability distribution model in the recognition scenario based on the biological feature of the first recognition object; and
   obtaining the likelihood score based on the posterior probability part and the marginal probability part.

3. The method according to claim 1, wherein the determining the likelihood score based on the biological feature of the first registration object and the biological feature of the first recognition object comprises:
   determining a posterior probability distribution template of the probability distribution model in the registration scenario based on the biological feature of the first registration object;
   mapping the posterior probability distribution template from the registration scenario to the recognition scenario based on the mapping relationship, to obtain a mapped posterior probability distribution template;
   determining the posterior probability part of the probability distribution model in the recognition scenario based on the mapped posterior probability distribution template;
   determining the marginal probability part of the probability distribution model in the recognition scenario based on the biological feature of the first recognition object; and
   obtaining the likelihood score based on the posterior probability part and the marginal probability part.

4. The method according to claim 2, wherein
   both the probability distribution model of the registration scenario and the probability distribution model of the recognition scenario comply with a linear Gaussian distribution;
   the probability distribution parameters between the different registration objects comprise a mean and a variance of feature space distributions of the different registration objects in the registration scenario;
   the probability distribution parameters between the different samples of the same registration object comprise a variance of feature space distributions of the same registration object in the registration scenario;
   the probability distribution parameters between the different recognition objects comprise a mean and a variance of feature space distributions of the different recognition objects in the recognition scenario; and
   the probability distribution parameters between the different samples of the same recognition object comprise a variance of feature space distributions of the same recognition object in the recognition scenario.

5. The method according to claim 4, wherein the likelihood score is determined based on the linear Gaussian distribution.

6. The method according to claim 2, wherein the mapping relationship is determined according to a trained mapping function, and the trained mapping function is obtained by using the following method:
   estimating a feature distribution in the registration scenario based on registration training data;
   estimating a feature distribution in the recognition scenario based on recognition training data;
   determining, according to a mapping function and based on the registration training data and the recognition training data, a loss function based on a criterion for maximum likelihood estimation, wherein the mapping function is used for reversible mapping between the feature distribution in the registration scenario and the feature distribution in the recognition scenario; and
   adjusting a parameter of the mapping function according to the loss function until the loss function satisfies loss converge, to obtain the trained mapping function.

7. The method according to claim 6, wherein the mapping function is a linear function of one variable, and the parameter of the mapping function comprises two constants of the linear function of one variable.

8. The method according to claim 6, wherein a machine learning model corresponding to the loss function is used for a maximum likelihood probability linear regression (MLLR) task.

9. The method according to claim 1, further comprising:
obtaining biological features extracted from a plurality of samples of a second recognition object in the recognition scenario, and determining likelihood scores respectively corresponding to the plurality of samples of the second recognition object;
selecting, based on the likelihood scores respectively corresponding to the plurality of samples of the second recognition object, a feature used for status update from the biological features extracted from the plurality of samples of the second recognition object; and
updating, by using the feature used for the status update, the probability distribution parameters between the different samples of the same recognition object comprised in the probability distribution model of the recognition scenario.

10. The method according to claim 1, further comprising:
clustering, by using a clustering algorithm, the probability distribution parameters between the different samples of the same recognition object comprised in the probability distribution model of the recognition scenario to obtain a plurality of submodels, wherein
the plurality of submodels respectively correspond to different statuses of the same recognition object; and
the marginal probability part of the likelihood score is fused with scoring results of the plurality of submodels.

11. The method according to claim 1, wherein the biological feature comprises a voiceprint feature or a facial feature or a fingerprint feature.

12. The method according to claim 1, wherein the registration scenario and the recognition scenario respectively correspond to different devices.

13. A chip system, wherein the chip system is applied to an electronic device, the chip system comprises one or more interface circuits and one or more processors, and the one or more processors are configured to execute computer instructions to cause the electronic device to:
obtain a biological feature extracted from a first registration object in a registration scenario;
obtain a biological feature extracted from a first recognition object in a recognition scenario;
determine a likelihood score based on the biological feature of the first registration object and the biological feature of the first recognition object; and
determine, based on the likelihood score, whether an identity of the first recognition object is consistent with an identity of the first registration object, wherein
the likelihood score comprises a posterior probability part and a marginal probability part;
the posterior probability part is determined based on the biological feature of the first registration object, a probability distribution model of the registration scenario, and a mapping relationship between the probability distribution model of the registration scenario and a probability distribution model of the recognition scenario;
the probability distribution model of the registration scenario comprises probability distribution parameters between different registration objects and probability distribution parameters between different samples of a same registration object, based on a biological feature being extracted from one or more registration objects in the registration scenario,
the probability distribution model of the recognition scenario comprises probability distribution parameters between different recognition objects and probability distribution parameters between different samples of a same recognition object, based on a biological feature being extracted from one or more recognition objects in the recognition scenario; and
the marginal probability part is determined based on the biological feature of the first recognition object, the probability distribution model of the recognition scenario, and the mapping relationship.

14. A non-transitory computer-readable storage medium, wherein the computer-readable storage medium stores computer program instructions that, when executed by a processor, cause the processor to:
obtain a biological feature extracted from a first registration object in a registration scenario;
obtain a biological feature extracted from a first recognition object in a recognition scenario;
determine a likelihood score based on the biological feature of the first registration object and the biological feature of the first recognition object; and
determine, based on the likelihood score, whether an identity of the first recognition object is consistent with an identity of the first registration object, wherein
the likelihood score comprises a posterior probability part and a marginal probability part;
the posterior probability part is determined based on the biological feature of the first registration object, a probability distribution model of the registration scenario, and a mapping relationship between the probability distribution model of the registration scenario and a probability distribution model of the recognition scenario;
the probability distribution model of the registration scenario comprises probability distribution parameters between different registration objects and probability distribution parameters between different samples of a same registration object, based on a biological feature being extracted from one or more registration objects in the registration scenario,
the probability distribution model of the recognition scenario comprises probability distribution parameters between different recognition objects and probability distribution parameters between different samples of a same recognition object, based on a biological feature being extracted from one or more recognition objects in the recognition scenario; and
the marginal probability part is determined based on the biological feature of the first recognition object, the probability distribution model of the recognition scenario, and the mapping relationship.

15. An identity authentication system, comprising a processor, wherein the processor is coupled to a memory, the memory stores program instructions, and the program instructions stored in the memory are executed by the processor to cause the system to perform:
obtaining a biological feature extracted from a first registration object in a registration scenario;
obtaining a biological feature extracted from a first recognition object in a recognition scenario;

determining a likelihood score based on the biological feature of the first registration object and the biological feature of the first recognition object; and determining, based on the likelihood score, whether an identity of the first recognition object is consistent with an identity of the first registration object, wherein the likelihood score comprises a posterior probability part and a marginal probability part;

the posterior probability part is determined based on the biological feature of the first registration object, a probability distribution model of the registration scenario, and a mapping relationship between the probability distribution model of the registration scenario and a probability distribution model of the recognition scenario;

the probability distribution model of the registration scenario comprises probability distribution parameters between different registration objects and probability distribution parameters between different samples of a same registration object, based on a biological feature being extracted from one or more registration objects in the registration scenario, the probability distribution model of the recognition scenario comprises probability distribution parameters between different recognition objects and probability distribution parameters between different samples of a same recognition object, based on a biological feature being extracted from one or more recognition objects in the recognition scenario; and the marginal probability part is determined based on the biological feature of the first recognition object, the probability distribution model of the recognition scenario, and the mapping relationship.

16. The identity authentication system according to claim 15, wherein the program instructions stored in the memory are further executed by the processor to cause the system to perform:

mapping the biological feature of the first recognition object from the recognition scenario to the registration scenario based on the mapping relationship, to obtain a mapped biological feature of the first recognition object;

determining a posterior probability distribution template of the probability distribution model in the registration scenario based on the biological feature of the first registration object;

determining the posterior probability part of the probability distribution model in the registration scenario based on the posterior probability distribution template and the mapped biological feature of the first recognition object;

determining the marginal probability part of the probability distribution model in the recognition scenario based on the biological feature of the first recognition object; and obtaining the likelihood score based on the posterior probability part and the marginal probability part.

17. The identity authentication system according to claim 15, wherein the program instructions stored in the memory are further executed by the processor to cause the system to perform:

determining a posterior probability distribution template of the probability distribution model in the registration scenario based on the biological feature of the first registration object;

mapping the posterior probability distribution template from the registration scenario to the recognition scenario based on the mapping relationship, to obtain a mapped posterior probability distribution template;

determining the posterior probability part of the probability distribution model in the recognition scenario based on the mapped posterior probability distribution template;

determining the marginal probability part of the probability distribution model in the recognition scenario based on the biological feature of the first recognition object; and obtaining the likelihood score based on the posterior probability part and the marginal probability part.

18. The identity authentication system according to claim 16, wherein both the probability distribution model of the registration scenario and the probability distribution model of the recognition scenario comply with a linear Gaussian distribution;

the probability distribution parameters between the different registration objects comprise a mean and a variance of feature space distributions of the different registration objects in the registration scenario;

the probability distribution parameters between the different samples of the same registration object comprise a variance of feature space distributions of the same registration object in the registration scenario;

the probability distribution parameters between the different recognition objects comprise a mean and a variance of feature space distributions of the different recognition objects in the recognition scenario; and the probability distribution parameters between the different samples of the same recognition object comprise a variance of feature space distributions of the same recognition object in the recognition scenario.

19. The identity authentication system according to claim 18, wherein the likelihood score is determined based on the linear Gaussian distribution.

20. The identity authentication system according to claim 16, wherein the program instructions stored in the memory are further executed by the processor to cause the system to perform:

estimating a feature distribution in the registration scenario based on registration training data;

estimating a feature distribution in the recognition scenario based on recognition training data;

determining, according to a mapping function and based on the registration training data and the recognition training data, a loss function based on a criterion for maximum likelihood estimation, wherein the mapping function is used for reversible mapping between the feature distribution in the registration scenario and the feature distribution in the recognition scenario; and adjusting a parameter of the mapping function according to the loss function until the loss function satisfies loss converge, to obtain the trained mapping function.

21. The identity authentication system according to claim 20, wherein the mapping function is a linear function of one variable, and the parameter of the mapping function comprises two constants of the linear function of one variable.

22. The identity authentication system according to claim 20, wherein a machine learning model corresponding to the loss function is used for a maximum likelihood probability linear regression (MLLR) task.

23. The identity authentication system according to claim 15, wherein the program instructions stored in the memory are further executed by the processor to cause the system to perform:

clustering, by using a clustering algorithm, the probability distribution parameters between the different samples of the same recognition object comprised in the probability distribution model of the recognition scenario to obtain a plurality of submodels, wherein
the plurality of submodels respectively correspond to different statuses of the same recognition object; and the marginal probability part of the likelihood score is fused with scoring results of the plurality of submodels.

* * * * *